United States Patent [19]

Miyatake et al.

[11] Patent Number: 5,202,863

[45] Date of Patent: Apr. 13, 1993

[54] MAGNETO-OPTICAL DISK UNIT COMPATIBLE WITH DIFFERENT TWO TYPES OF MAGNETO-OPTICAL DISKS AND A MAGNETIC-FIELD GENERATOR SUITABLE THEREOF

[75] Inventors: Norio Miyatake, Hyogo; Hidetsugu Kawabata, Osaka; Kiyoshi Uchida, Osaka; Yasumori Hino, Osaka; Teruyuki Takizawa, Osaka; Tohru Nakamura, Osaka, all of Japan

[73] Assignee: Matsushita Electric Industrial Co., Ltd., Osaka, Japan

[21] Appl. No.: 757,461

[22] Filed: Sep. 10, 1991

[30] Foreign Application Priority Data

Sep. 11, 1990 [JP] Japan .................. 2-242107
Mar. 5, 1991 [JP] Japan .................. 3-038329

[51] Int. Cl.⁵ .............. G11B 13/04; G11B 11/12; G11B 11/10
[52] U.S. Cl. .................. 369/13; 360/103; 360/104; 360/66; 360/114
[58] Field of Search .......... 360/103, 104, 59, 66, 360/114, 60; 369/13

[56] References Cited

U.S. PATENT DOCUMENTS

| | | | |
|---|---|---|---|
| 4,672,594 | 6/1987 | Kato et al. | 360/114 |
| 4,688,203 | 8/1987 | Koshi et al. | 369/111 |
| 4,837,758 | 6/1989 | Motoyama et al. | 369/13 |
| 4,959,820 | 9/1990 | Horimai et al. | 360/114 |
| 5,043,960 | 8/1991 | Nakao et al. | 360/59 |
| 5,088,074 | 2/1992 | Sato | 360/59 |

Primary Examiner—Hoa Nguyen
Attorney, Agent, or Firm—Wenderoth, Lind & Ponack

[57] ABSTRACT

A magneto-optical disk unit has a first magnetic-field generator for generating a magnetic field corresponding to a frequency in a recording signal frequency band and a second magnetic-field generator for generating DC magnetic fields of both north-seeking and south-seeking poles in a non-contact manner with a loaded magneto-optical disk. The first magnetic-field generator has a slider part for sliding over a loaded magneto-optical disk in a floating manner using an aerodynamic effect. The unit further has a transfer driver for moving the first and second magnetic-field generators in a direction parallel to the loaded magneto-optical disk and a rotary plate for vertically moving the first magnetic-field generator. The unit also has a disk judging circuit for judging whether the loaded magneto-optical disk is of a magnetic-field-modulation overwritable type (first type) or an erase-operation-required type (second type), and a controller for controlling the rotary plate to bring the first magnetic-field generator into contact with the loaded disk when this disk is of the first type and to keep it raised from the disk when this disk is of the second type. The second magnetic-field generator is used when the disk is judged to be of the second type.

13 Claims, 15 Drawing Sheets

MAGNETO-OPTICAL DISK UNIT COMPATIBLE WITH DIFFERENT TWO TYPES OF MAGNETO-OPTICAL DISKS AND A MAGNETIC-FIELD GENERATOR SUITABLE THEREOF

BACKGROUND OF THE INVENTION

1. Field of the Invention

The present invention relates to a magneto-optical disk unit which can perform both overwriting on a magneto-optical disk by a magnetic-field-modulation overwrite method and the recording, reading and erasing of a magneto-optical disk which requires a conventional erase process, and further relates to magnetic-field generators for use with magnetic-field-modulation overwritable magneto-optical disks.

2. Description of the Prior Art

In the last few years, magneto-optical disk units capable of recording information signals at high densities have increasingly come into practical use. The magneto-optical disk units are available in two types, one that commonly uses as a recording medium an alloy of a rare earth metal and a transition metal and requires three processes of erasing, recording, and reading, and the other that enables overwriting using a magnetic field modulation method. The above-mentioned two types of conventional magneto-optical disk units are described below in terms of recording with reference to the accompanying drawings.

FIG. 25 is an illustration showing an essential part of the prior-art magneto-optical disk unit (prior art 1) of the type that requires the three processes: erasing, recording, and reading. In the figure, reference numeral 1 denotes a magneto-optical disk, wherein a magneto-optical recording layer 3 is formed on a substrate 2 by means of a thin-film formation technique such as sputtering. An overcoat layer 4 is formed on the recording layer 3. Reference numeral 7 indicates a magnetic-field generator constituted from a magnet or an electromagnet, and reference numeral 6 designates an objective lens for concentrating laser beams 5.

The conventional magneto-optical disk unit as constructed above performs its write, erase and read operations as follows.

When the record operation starts, the magneto-optical recording layer 3 on the substrate 2 has been unified in a direction of magnetization through the erase process. First, the magneto-optical disk 1 thus arranged has a magnetic field applied thereto by the magnetic-field generator 7 and then the magneto-optical recording layer 3 is heated to a temperature exceeding the Curie temperature by a laser beam 5 condensed by the objective lens 6, so that the magnetization of the magneto-optical recording layer 3 is changed and fixed, when cooled, depending on the direction of the magnetic field. In this way, the record or write process is accomplished. The laser beam 5 is actually an on/off signal modulated by a write signal and therefore the magneto-optical recording layer 3 is magnetically inverted only at those portions that have been heated.

In order to erase the previously written data, that is, in order to unify the directions of magnetization of the magneto-optical recording layer 3, the magnetic field of the magnetic-field generator 7 is inverted and then the magneto-optical recording layer 3 is continuously irradiated with laser beams 5.

In the read operation, the magnetic-optic recording layer 3 is irradiated with a laser beam, which is considerably weak, as compared with a laser beam used during the write process. Data read is performed by making use of the fact that the Kerr angle of rotation of reflection light of the laser beam varies depending on the direction of magnetization.

In the case of the above-mentioned magneto-optical disk unit, to rewrite on it, it is necessary to erase the previously written information and thereafter perform recording. Accordingly, it takes much time to record information. To eliminate this disadvantage, overwrite techniques are now being investigated with great interest. Such techniques include a so-called magnetic-field-modulation method proposed in Japanese Patent Laid-Open Publication 60-48806 (issued in 1985). This magnetic-field-modulation method allows high-speed data recording using magnetic-field generating means (flying magnetic head) that travels above a magneto-optical disk for use as data files in a floating manner.

FIG. 26 illustrates a magneto-optical disk unit (prior art 2) using the above magnetic-field-modulation overwrite method. Like parts in FIG. 25 and FIG. 26 are indicated by the same numerals. In the figure, reference numeral 11 denotes a magnetic-field-modulation overwritable magneto-optical disk wherein a special overcoat layer 8 is further formed on the magneto-optical recording layer 3. Reference numeral 9 indicates a flying magnetic head 9 and reference numeral 10 indicates a magnetic-head current driving circuit 10 for the flying magnetic head 9. When the magneto-optical disk is still, the flying magnetic head 9 and the magneto-optical disk 11 are in contact with each other. When the magneto-optical disk is rotating, the head 9 is lifted approximately a few $\mu m$ from the special overcoat layer 8. Namely, a contact start/stop (CSS) method is employed. For a write operation, the magneto-optical recording layer 3 is heated to a temperature exceeding the Curie temperature by the laser beam 5 continuously fired, while a modulated magnetic field is simultaneously applied to the vicinity of the heated portions by the flying magnetic head 9. The heated magneto-optical recording layer 3 is magnetically inverted depending on the direction of the modulated magnetic field and, when it is cooled, directions of magnetization are fixed, thus recorded as information. In the case of prior art 2, the magneto-optical recording layer is heated for the rewrite operation. Therefore, even if recording tracks have information already written thereon, the previous information can be erased simultaneously with the write operation, or replaced with new information. In this way, an overwrite operation is accomplished.

However, the prior art magneto-optical disk unit (prior art 2) must use a magneto-optical disk provided with a special coating to cope with the CSS method.

Disk units of prior art 1 are being commercialized at present and those of prior art 2 capable of overwriting are under development as coming-generation devices. What matters here is that the magneto-optical disks of prior art 1, given no consideration of providing a special overcoat for CSS thereto, cannot be used in the coming-generation model of prior art 2. When they serve as data files, it is critical that information written with the preceding-generation model units (prior art 1) can be read and written with the coming-generation model units (prior art 2). Thus, it has been a desire that magneto-optical disks used for prior art 1 be also usable in the units of prior art 2.

Further, the magneto-optical disk unit of prior art 2 cannot perform a stable float-travel or traveling in a floating manner unless the surface precision of the disk is satisfactory, since the flying magnetic head 9 floats only a few μm or so from the aforementioned special overcoat layer 8 when the magneto-optical disk is in a rotating state. The magneto-optical disks actually used employ a substrate molded of plastic and further the special overcoat layer 8 is applied thereto by a spin coat method. This results in that the disks so constructed are not even in an outer rim portion.

FIG. 24 shows the shape of such an outer rim portion of a disk. A molded substrate has a substrate protuberance D and a substrate burr E. The size of the substrate protuberance D is approximately 5 to 30 μm, and that of the substrate burr E is approximately 5 to 40 μm. Although these sizes can be reduced to some extent by devising the molding conditions and molding dies, it is very difficult to make them less than 5 μm. Also, after the special overcoat layer 8 is applied, there develops an upheaval in the peripheral end of the disk. The width G of the upheaval is approximately 0.8 to 1.5 mm, and the height thereof approximately 15 to 50 μm. This upheaval will take place due to the action of surface tension of the overcoat material even though the substrate is perfectly molded.

The use of the conventional flying head for such a disk would cause an unstable floating and a contact with the disk resulting in damage to the special overcoat 8 when the head comes to the peripheral end of the disk.

SUMMARY OF THE INVENTION

The present invention has been developed with a view to substantially solving the above described disadvantages and has for its essential object to provide a magneto-optical disk unit which enables the conventional recording, reading, and erasing for use with the conventional magneto-optical disk unit that requires the erase process, and which also enables overwriting by magnetic field modulation for use with the magnetic-field-modulation overwritable magneto-optical disk unit.

Another object of the present invention is to provide a magnetic-field generator (flying head) which can obtain a stable float even when the magnetic-field generator (flying head) comes to a rim portion of the disk.

In order to achieve the first object, the present invention provides a magneto-optical disk unit compatible with not only a magneto-optical disk of a first type that can be overwritten through modulation of a magnetic field, but also with a magneto-optical disk of a second type that requires an erase operation prior to undergoing a write operation. This magneto-optical disk unit comprises a first magnetic-field generator for generating a first magnetic field corresponding to a frequency in a recording signal frequency band, said first magnetic-field generator having a slider part for sliding over a loaded magneto-optical disk in a floating manner using an aerodynamic effect; a second magnetic-field generator for generating DC magnetic fields of both north-seeking and south-seeking poles as a second magnetic field in a non-contact manner with said magneto-optical disk; drive means for moving said first and second magnetic-field generators in a direction parallel to said loaded magneto-optical disk; and up-down drive means for vertically moving said first magnetic-field generator to bring it into contact with a surface of said magneto-optical disk of said first type.

Preferably, the magneto-optical disk unit further comprises judging means for judging whether said magneto-optical disk is of said first type or said second type; and controlling means for, based on a judging result, controlling said up-down drive means such that:

a) when said magneto-optical disk is judged by said judging means to be of said first type, said first magnetic-field generator comes into contact with said loaded magneto-optical disk and applies said first magnetic field onto said loaded magneto-optical disk, and b) when said magneto-optical disk is judged to be of said second type, said first magnetic-field generator is maintained a predetermined distance apart from said loaded magneto-optical disk and said second magnetic field generator applies said second magnetic field onto said loaded magneto-optical disk in no contact therewith.

Furthermore, the present invention provides a magneto-optical disk unit compatible with the magneto-optical disks of the first and second types, which comprises a magnetic-field generator having a first magnetic-field generating part for generating a first magnetic field corresponding to a frequency in a recording signal frequency band and a second magnetic-field generating part for generating DC magnetic fields of both north-seeking and south-seeking poles as a second magnetic field in a non-contact manner with a loaded magneto-optical disk, said magnetic-field generator having a slider part for sliding over said loaded magneto-optical disk in a floating manner using an aerodynamic effect; drive means for horizontally moving said magnetic-field generator in a direction parallel to said loaded magneto-optical disk; and up-down drive means for vertically moving said magnetic-field generator to bring it into contact with a surface of said loaded magneto-optical disk.

In this case, too, it is preferable to further provide the magneto-optical unit with judging means for judging whether said loaded magneto-optical disk is of said first type or said second type; and controlling means for, based on a judging result of said judging means, controlling said up-down drive means such that:

a) when said magneto-optical disk is judged by said judging means to be of said first type, said magnetic-field generator comes into contact with said loaded magneto-optical disk and applies said first magnetic field onto said loaded magneto-optical disk by means of said first magnetic-field generating part, and b) when said magneto-optical disk is judged to be of said second type, said magnetic-field generator is maintained a predetermined distance apart from said loaded magneto-optical disk and applies said second magnetic field onto said loaded magneto-optical disk by means of said second magnetic-field generating part.

In an embodiment, the magnetic-field generator is separable into said first magnetic-field generating part and second magnetic-field generating part and said first magnetic-field generating part is provided with said slider part. Said second magnetic-field generating part is fixed to an arm having a rigidity, and said first magnetic-field generating part is mounted to said arm through an elastic member such that said first magnetic-field generating part is variable in distance from said second magnetic-field generating part, said first magnetic-field generating part thereby being connected with and separated from said second magnetic-field generating part.

With the above-described arrangement, it is first judged whether or not a loaded magneto-optical disk is of the first type, i.e., a magnetic-field-modulation overwritable magneto-optical disk, or of the second type, i.e., an erase-operation-required disk. If the loaded magneto-optical disk is judged by the judging means to be of the first type, the first magnetic-field generator is brought into contact with a surface of the loaded magneto-optical disk by the up-down drive means in one embodiment. In another embodiment, the magnetic-field generator having both the first and second magnetic-field generating parts is brought into contact with the loaded magneto-optical disk. The first magnetic field generator (the magnetic field generator) flies with rotation of the disk and then slides over it in a floating manner. Then, a laser beam of an optical head is moved to a target track by the drive means that can transfer the first magnetic-field generator (the magnetic-field generator) in a direction parallel to the magneto-optical disk, so that overwriting is accomplished by a modulated magnetic field from the first magnetic-field generator (the first magnetic-field generating part of the magnetic-field generator).

If, in the arrangement of the magnetic-field generator having the first and the second magnetic-field generating parts, a magnetic pole of the first magnetic-field generating part forms part of a magnetic pole of the second magnetic-field generating part, then the first magnetic-field generating part is set so as to be positioned above a recording track. Accordingly, the magnetic-field generator is brought into contact with the surface of the magneto-optical disk by the up-down drive means, so that recording is accomplished by the magnetic-field modulation method.

When the first and the second magnetic-field generating parts are arranged to be separable from each other, only the first magnetic-field generating part is brought into contact with the surface of the magneto-optical disk, and made to float-travel to accomplish recording by the magnetic-field modulation method.

When the magneto-optical disk is of the second type that requires the erase process, the first magnetic-field generator and the magnetic-field generator are kept raised by the up-down drive means so as not with contact with the surface of the magneto-optical disk. The magnetic field necessary for erasing and recording is given by that from the second magnetic-field generator and the second magnetic-field generating part of the magnetic field generator.

When the second magnetic-field generator (the second magnetic-field generating part) is an electromagnet, a current polarity is switched between erasing and recording after the second magnetic-field generator (the magnetic-field generating part) is transferred to a desired track by the drive means.

When the second magnetic-field generator (the second magnetic-field generating part) is a permanent magnet having both north-seeking and south-seeking poles (hereinbelow referred to as north pole and south pole), one of the north pole and the south pole is moved to a target track by the transfer drive means so that a magnetic polarity necessary for erasing or recording is obtained, where erasing or recording is effected.

When the separable magnetic-field generator is used, the first and the second magnetic-field generating parts are put into a combined state, and a current is applied to a second coil provided in the second magnetic-field generating part to thereby effect erasing or recording. To put the first and second magnetic-field generating parts into a combined state, the following methods are used.

a) A suction force resulting from the current flow through the coil of the second magnetic-field generating part is utilized.

b) The first magnetic-field generating part is mechanically made closer to the second magnetic-field generating part.

c) An electrical signal is given to some element transformable with the electrical signal.

Furthermore, in order to achieve the second object, the present invention provides a magnetic-field generator for use in a magneto-optical disk unit, which comprises a slider part capable of sliding above a magneto-optical disk in a floating manner using an aerodynamic effect; and a magnetic-field generating part for providing a magnetic field to the magneto-optical disk, having a magnetic pole disposed on a side of said slider part such that said magnetic pole is positioned outwardly of said slider part relative to a radial direction of said magneto-optical disk, an end surface of said magnetic pole receding from a slide surface of said slider part so as not to contact with the magneto-optical disk.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiment 1

Figure 1:
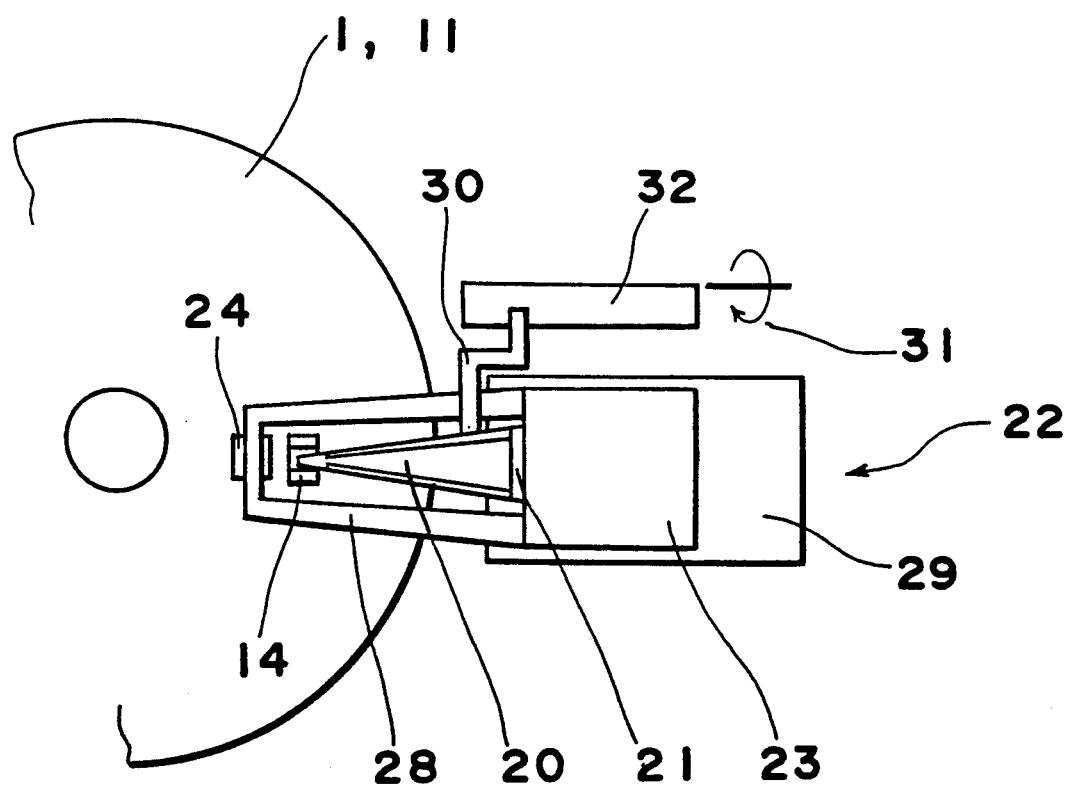
FIGS. 1 and 2 are a plan view and a side view, respectively, of the basic construction of a magneto-optical disk unit of a first embodiment according to the present invention.
Figure 2:
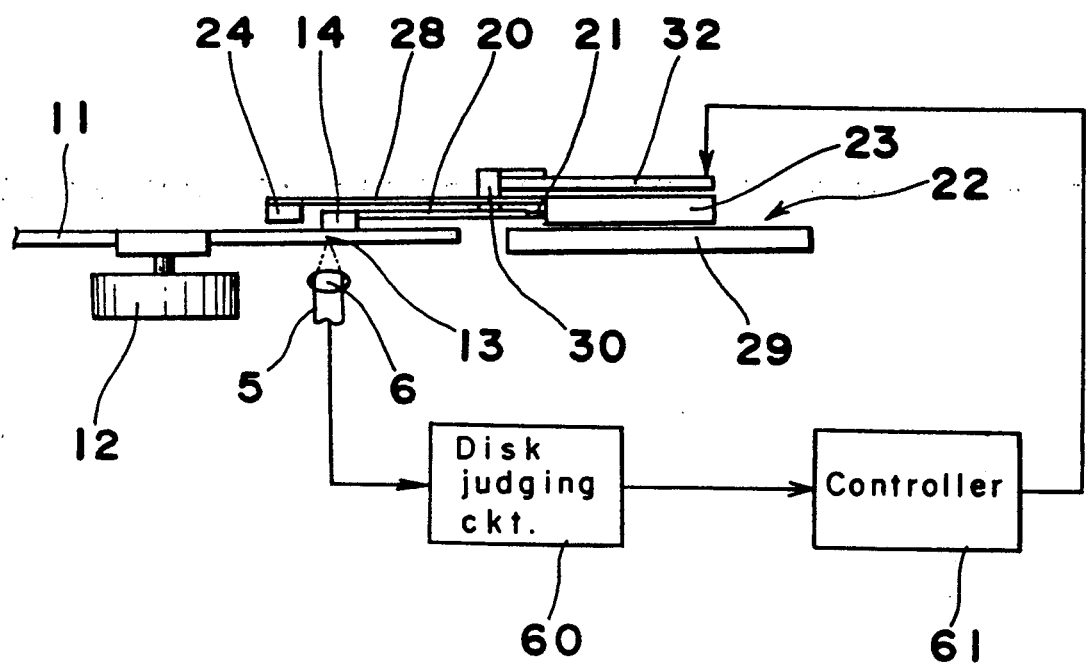
Figure 3A:
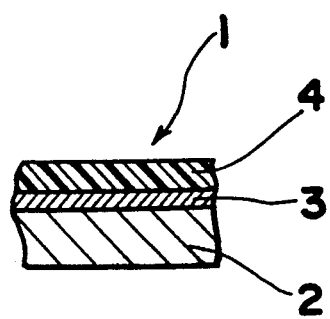
FIGS. 3A and 3B are sectional views showing the structure of magneto-optical disk units of the erase-operation-required type and of the magnetic-field-modulation type, respectively.
Figure 3B:
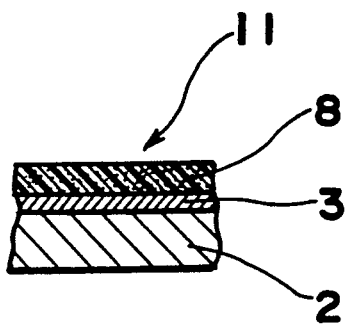
Figure 25:
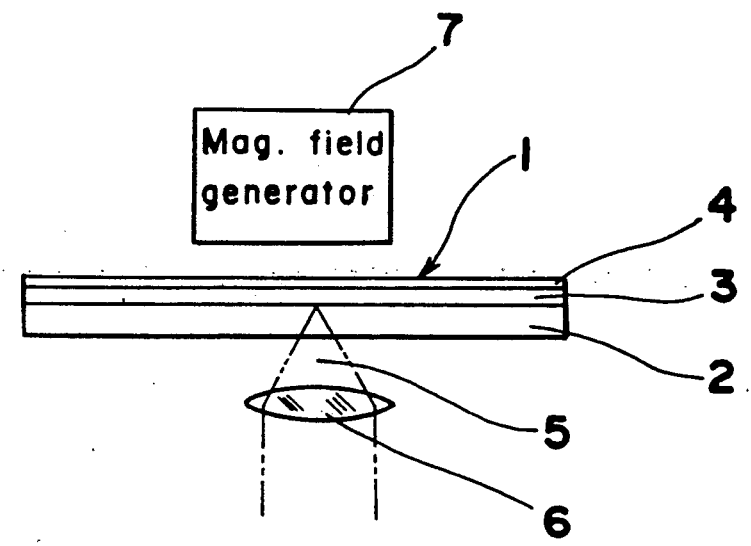
FIG. 25 is a schematic view of a conventional magneto-optical disk unit incorporating an erase-operation-required disk.
Figure 26:
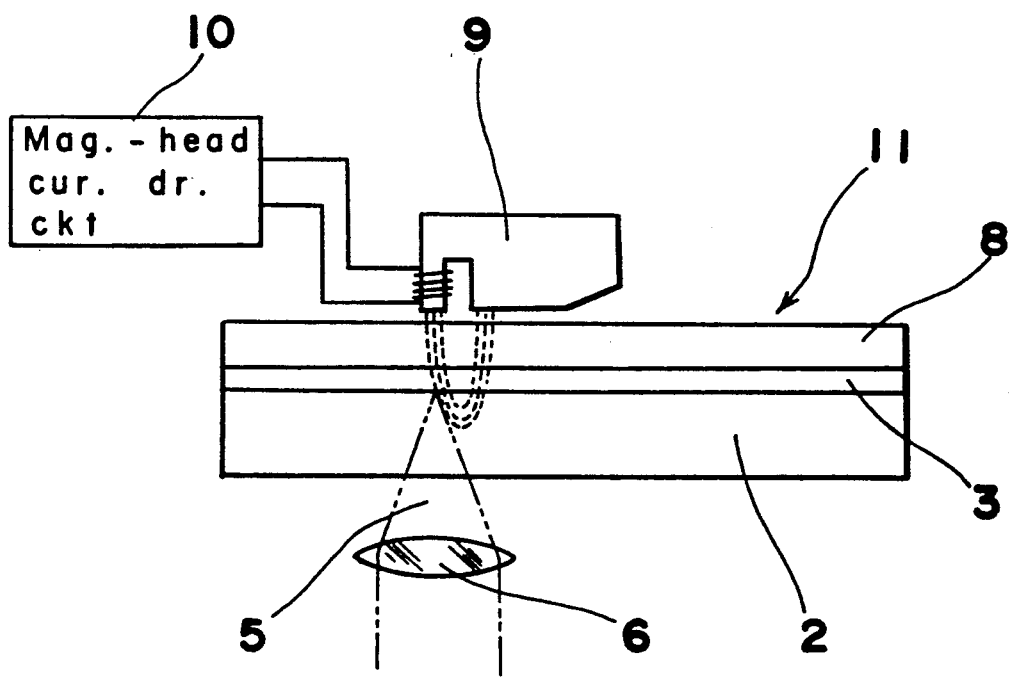
FIG. 26 is a schematic view of a conventional magneto-optical disk unit incorporating a magnetic-field-modulation overwritable disk.

A first embodiment of the present invention is shown in FIG. 1, FIG. 2, FIG. 4 and FIGS. 5A–5C. FIGS. 1 and 2 are a plan view and a side view, respectively, of the basic construction of a magneto-optical disk unit of a first embodiment according to the present invention. FIGS. 3A and 3B are sectional views of part of magneto-optical disks used in this magneto-optical disk unit which are also used in the aforementioned two types of prior art magneto-optical disk units, respectively. It is to be noted that parts similar to those in FIGS. 25 and 26 are indicated by the same reference numerals used in those figures and a detailed description of those parts is omitted here.

Referring now to FIGS. 3A and 3B, in the case of the magneto-optical disk 1 that requires an erase process for accomplishing a write operation, as described above as prior art 1, an ultraviolet hardening resin is commonly used as the overcoat layer 4. Meanwhile, in the case of the magnetic-field modulation overwritable magneto-optical disk 11, a resin resulting from kneading an abrasive and a lubricant into an ultraviolet hardening resin or a thin film such as a DLC (Diamond-Like Carbon) is used to make the disk 11 compatible with the CSS system. Although the magneto-optical disks 1, 11 actually have further layers in addition to the above layers to control the sensitivity, to increase the Kerr angle of rotation, and to enhance the weatherability, such layers are omitted in the drawings for the sake of simplicity.

Referring now to FIGS. 1 and 2, reference numeral 12 denotes a spindle motor; 13 denotes a convergence spot of a laser beam 5; and 14 denotes a first magnetic-field generator so constructed as to generate a magnetic field corresponding to the range of a recording signal frequency band and capable of traveling over the magneto-optical disk in a floating manner using an aerodynamic effect.

Figure 4:
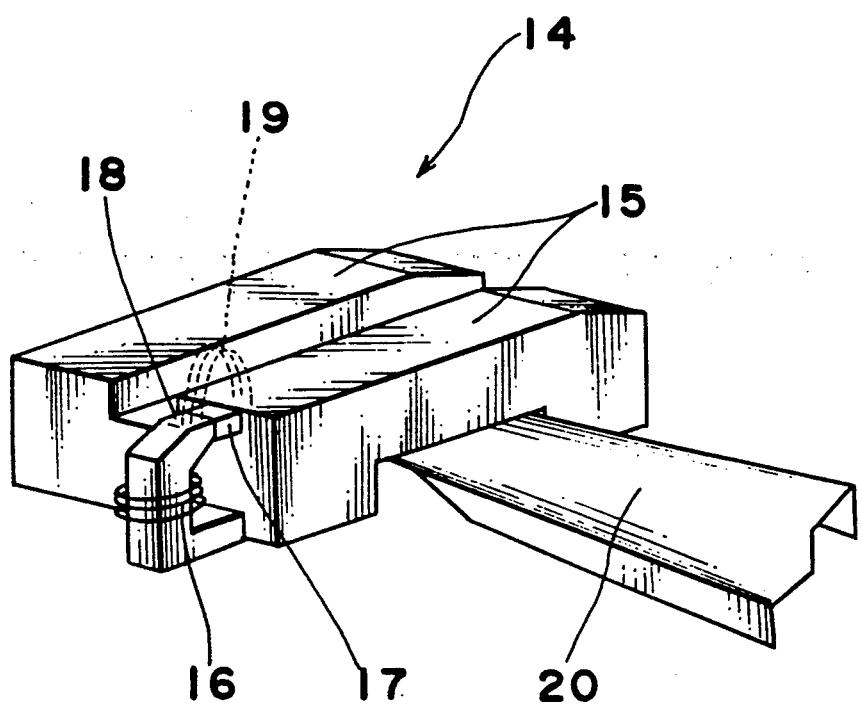
FIG. 4 is a perspective view of a first magnetic-field generator used in the first embodiment.

FIG. 4 is an enlarged perspective view of the first magnetic-field generator 14. This first magnetic-filed generator 14 is of a monolithic type in which a slider part and a magnetic circuit are made of the same magnetic material. In this figure, reference numeral 15 denotes a slider float-traveling above a magneto-optical disk using the aerodynamic effect; reference numeral 16 denotes a coil; reference numeral 17 denotes a magnetic denotes a coil; reference numeral 17 denotes a magnetic gap; reference numeral 18 indicates a primary magnetic pole; reference numeral 19 denotes a magnetic field; and reference numeral 20 designates a load beam for supporting the first magnetic-field generator 14 and bringing the magnetic-field generator 14 into contact with the magnetic-field-modulation overwritable magneto-optical disk 11.

When a current is applied to the coil 16, the magnetic field 19 is generated. For the coil 16, which is driven at a frequency in the range of the recording signal frequency band, a coil having 10 turns or so is used, taking into account an impedance involved. Vertical components of the magnetic field 19 with respect to the magneto-optical disk are effective components for overwriting, the effective range thereof being approximately 100 $\mu m$ from the slider surface. This effective range can be changed depending on the strength of a magnetomotive force and the design of a magnetic core. In the float-traveling state, the slider 15 is in general made to fly 2 to 10 $\mu m$ above the disk, though the amount of float depends on the design of the slider. Since the thickness of the special overcoat layer 8 of the magnetic-field-modulation overwritable magneto-optical disk is at most 20 $\mu m$ or so, the above amount of flying or float can yield a sufficient magnetic field to the magneto-optical recording layer 3.

As shown in FIGS. 1 and 2, an end of the load beam 20 is joined with a moving part 23 of a transfer driver 22 through a plate spring 21, whereby the inclination angle of the load beam 20 is allowed to be changed with respect to the moving part 23. The moving part 23 is constituted from a linear motor, a linear stepping motor, or the like. The transfer driver 22 of the present embodiment is independent of a transfer driver of an optical head (not shown).

Figure 5A:
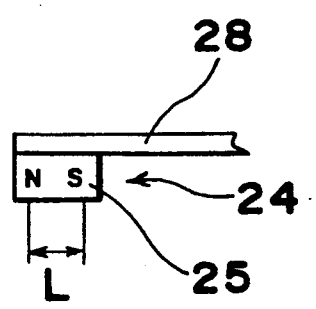
FIGS. 5A, 5B and 5C are schematic views showing examples of a second magnetic-field generator.
Figure 5B:
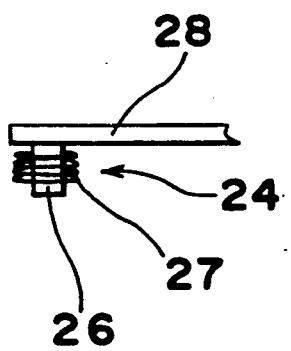
Figure 5C:
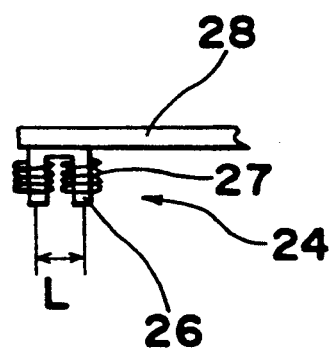

Reference numeral 24 indicates a second magnetic-field generator capable of generating DC magnetic fields of both north and south poles. The second magnetic-field generator 24 can be provided in the following three types:

1) A permanent magnet type as shown in FIG. 5A;
2) A single-pole DC electromagnetic type as shown in FIG. 5B; and
3) A U-shaped DC electromagnetic type in which two poles confront the surface of the magneto-optical disk, as shown in FIG. 5C.

In FIGS. 5A–5C, reference numeral 25 denotes a permanent magnet having both north and south poles; reference numeral 26 denotes a magnetic core; reference numeral 27 denotes a coil; and character L shows a distance between the poles.

A support arm 28, having a rigidity, for supporting the second magnetic-field generator 24 is also joined with the moving part 23 of the transfer driver 22. In any case of FIGS. 5A–5C, a north or south magnetic field can be provided onto any track of the magneto-optical disk by moving the second magnetic-field generator to travel in a direction parallel to the magneto-optical-disk or by moving it in that way and further switching the current polarity of the electromagnet. If the magneto-optical disk 1 is free from surface fluctuation, the second magnetic-field generator 24 supported by the support arm 28 is maintained a constant distance apart from the magneto-optical disk at all times. Practically, a distance of 1 mm or so is provided in view of any possible surface fluctuation of the magneto-optical disk. The second magnetic-field generator 24 is so designed as to generate a DC magnetic field of approximately 200 oersted necessary for recording and erasing at the aforementioned distance.

Reference numeral 29 denotes a stationary part of the transfer driver 22, along which the moving part 23 can slide, thereby moving the first and second magnetic-field generators 14 and 24 from the innermost track position of the magneto-optical disk 1 to the outermost track position thereof.

Reference numeral 30 designates a load-beam support arm joined with the load beam 20 at one end and connected with a rotary plate 32 at the other end. Rotation of the rotary plate 32 in directions indicated by arrow 31 cause the load beam 20 to be moved up and down through the load beam support arm 30. In other words, the rotation of the rotary plate 32 brings the first magnetic-field generator 14 into contact with and apart from the magnetic-field-modulation rewritable magneto-optical disk 11.

The magneto-optical disk unit further has a disk judging circuit 50 and a controller 61. The disk judging circuit 60 is for judging whether an actually loaded magneto-optical disk is of a magnetic-field-modulation rewritable type 11 or of an erase-operation-required type 1 in a manner as described later. The controller 61 provides the rotary plate 32 with a control signal in response to an output from the disk judging circuit 60, so that the rotary plate 32 rotates in the corresponding direction.

Now the operation of the magneto-optical disk unit constructed as above is described below. First, at a time point or stage when a magneto-optical disk is loaded into the above magneto-optical disk unit, it is judged and decided by the disk judging circuit whether the magneto-optical disk is of the magnetic-field-modulation rewritable type 11 or of the erase-operation-required type 1. This decision is made by judging whether a cutout portion specially provided to a disk cartridge is present or absent, or by a reflection factor or color of the magneto-optical disk, or by reading information written on the disk, and so on. In the method that utilizes a difference in reflection factor or color of magneto-optical disks, since the magnetic-field-modulation overwritable magneto-optical disk 11 is provided with a special overcoat 8, it is possible to make use of a difference in reflection factor or color between the special and normal overcoats 8 and 4. In the method of reading information written on the disk, information previously written on a certain track is utilized. Normally, a disk stores in a certain area called a control track what conditions the disk is subject to in use, and this information may be used.

When a magneto-optical disk is judged to be of the erase-operation-required type 1, the rotary plate 32 is controlled by the controller 61 to hold the load-beam support arm 30 in a lifted state. As a result, the first magnetic-field generator 14 will not come into contact with the magneto-optical disk 1. For this magneto-optical disk 1, the first magnetic-field generator 14 is not used but the second magnetic-field generator 24 is used. When the magneto-optical disk unit is a data file unit, a built-in controller within the magneto-optical disk unit, in general, performs a sequence of initial operations so as to bring the magneto-optical disk into a state that enables recording, reading, and erasing, after the magneto-optical disk has come to rotate stably. Then, a desired n-th track is accessed, and signals are read from or written to the track.

Next, operations of the objective lens 6 of the optical head (not shown) and the moving part 23 of the transfer driver 22 are described. In the case of reading from the disk 1, by the traveling of the optical head itself (transfer means for the optical head is not shown, either) associated with a micro-movement of the objective lens 6, the convergence spot 13 of the laser beam 5 is made to access the n-th track, whereby a signal is read therefrom. In the case of recording or erasing, the convergence spot 13 of the laser beam 5 is made to access the n-th track as in the read operation. At the same time, the second magnetic-field generator 24 is driven by the transfer driver 22 to thereby move in proximity to the n-th track. When the second magnetic-field generator 24 is of the permanent magnet type having both north and south poles, as shown in FIG. 5A, the transfer driver 22 drives the second magnetic-field generator 24 to a position where, in recording, a magnetic field from the north pole is given (hereinafter, a magnetic field given to the magneto-optical disk 1 from the north pole is referred to as N magnetic-field and this is assumed to be the magnetic field in the recording state, while the counterpart in the erasing state is assumed to be S magnetic-field) and to a position, in erasing, where the S magnetic-field, that is, a magnetic field from the south pole is given. More specifically, in both the recording and the erasing states, the moving part 23 of the transfer driver 22 moves in the radial direction of the magneto-optical disk 1 by the distance L between both poles, thus changing in its setting position. Next, for the write or record operation, while the N magnetic-field is being applied to the magneto-optical disk 1, the laser beam 5 modulated by a recording signal heats the magneto-optical recording layer 3, resulting in the signal being written to the magneto-optical disk 1. In contrast, in the erasing state, while the S magnetic-field is being applied, the laser beam 5, continuously emitted, continuously heats the magneto-optical recording layer 3, thus erasing the magneto-optical disk 1. When the recording and erasing are alternately effected, the convergence spot 13 of the objective lens 6 is kept still on the same track, whereas the moving part 23 of the transfer driver 22 goes back and forth, thereby alternately providing the N and S magnetic-fields to the magneto-optical disk 1.

When the second magnetic-field generator 24 is of the single-pole DC electromagnet type as shown in FIG. 5B, a pole portion at the tip thereof moves in proximity to the n-th track and the polarity of the coil current is switched, thereby providing necessary magnetic fields N and S to the magneto-optical disk 1.

Further, when the second magnetic-field generator 24 is of the U-shaped electromagnet type in which two poles confront the surface of the magneto-optical disk 1 as shown in FIG. 5C, only one pole of the U-shaped electromagnet may be used. In this case, the polarity of the one magnet pole can be switched by switching that of the coil current. Alternatively, both magnetic poles may be used. In this case, without switching the polarity of the coil current, the moving part 23 of the transfer driver 22 is moved in a radial direction of the magneto-optical disk by a distance equivalent to the distance L between the N and S poles so as to use the other magnetic pole, thereby obtaining necessary magnetic fields of N and S. Either of these ways is possible depending on the design of the unit.

When the disk judging circuit 60 judges a loaded magneto-optical disk to be of the magnetic-field-modulation overwritable magneto-optical type 11, the rotary plate 32 rotates under control by the controller 61. As this occurs, the load-beam support arm 30 is released from the raised or lifted state, and the first magnetic-field generator 14 is brought into contact with the special overcoat 8 of the magneto-optical disk 11. It is to be noted that for this magneto-optical disk 11, the second magnetic-field generator 14 is not used, but the first magnetic-field generator 14 is used. The first magnetic-field generator 14 is so designed that its magnetic circuitry can generate a magnetic field corresponding to a recording signal frequency band, or that its inductance is a few $\mu H$ or less.

When the first magnetic-field generator 14 comes into contact with the special overcoat 8, the magneto-optical disk 11 starts to rotate, while the slider part 15 starts to travel in a sliding manner on the magneto-optical disk 11. From the time point when the rotating speed of the magneto-optical disk 11 exceeds a certain value, the slider part 15 enters a flying state as a result of aerodynamic effects. Thereafter, when the magneto-optical disk reaches a steady rotating state, the slider part 15 comes into a stable flying state. As in the case of the magneto-optical disk 1, the built-in controller within the magneto-optical disk unit performs a sequence of initial operations, thereby enabling the read and overwrite operations. For effecting read and overwrite operations to the n-th track, the operation of the optical head is the same as that for the magneto-optical disk 1, with the exception that the laser beam 5 used in the overwrite operation is of continuous light or of pulse light associated with the magnetic field of the magnetic-field generator 14.

When the n-th track is overwritten, the first magnetic-field generator 14 is driven by the transfer driver 22 so that the primary magnetic pole 18 approaches the n-th track and provides the recording magnetic field modulated by a modulation signal thereto. A current of the modulated signal is supplied to the coil 16 to generate a magnetic field 19 corresponding to the modulation signal, resulting in accomplishment of the overwriting.

Now the operation of the transfer driver 22 during the read process for the magneto-optical disks of either type 1 and 11 is described. Roughly, the read operation is carried out in two ways: one in which the transfer driver 22 is driven depending on tracks to be read from, and the other in which the first and second magnetic-field generators 14 and 24 are kept in their respective set positions on the magneto-optical disk 11. In the former case, a relatively small travel distance of the transfer driver 22 results when the regenerative read state is succeeded by a write or erase or overwrite state. On the other hand, in the latter case, power consumption can be reduced in the read operation. In addition, there are various possibilities with respect to where the first and second magnetic-field generators 14 and 24 are positioned after the read, write, erase, or overwrite operation is accomplished. For example, because a recording or writing operation for the n-th track is often followed by another recording operation for a track in the vicinity of the n-th track, the transfer driver 22 may be maintained in the same position for a while after a recording. In any case, the transfer mode for the magnetic-field generators 14 and 24 can be determined depending on the design concept of the magneto-optical disk unit.

As described above, the magneto-optical disk unit according to the present embodiment has, as means for providing a magnetic field to magneto-optical disks, a first magnetic-field generator 14 adapted to generate a magnetic field corresponding to a recording signal frequency band and constructed so as to float-travel above a magneto-optical disk using the aerodynamic effect, and a second magnetic-field generator 24 capable of generating DC magnetic fields of both north and south poles without contacting with a magneto-optical disk. The two magnetic-field generators 14 and 24 are selectively used depending on the type of the magneto-optical disk in association with drive means that can transfer the two magnetic-field generators in the direction parallel to the magneto-optical disk and the up-down drive means that can bring the first magnetic-field generator into contact with the surface of the magneto-optical disk. Thus, the magneto-optical disk unit of the present embodiment can effect recording, reading, and erasing not only with the magnetic-field-modulation overwritable magneto-optical disks but also with the conventional magneto-optical disks that require the erase process.

Before the description of the following embodiments proceed, it is to be noted that parts similar to the parts of Embodiment 1 will be indicated by the same reference numerals and that a detailed description on such parts will be omitted in the following embodiments.

Embodiment 2

Figure 6:
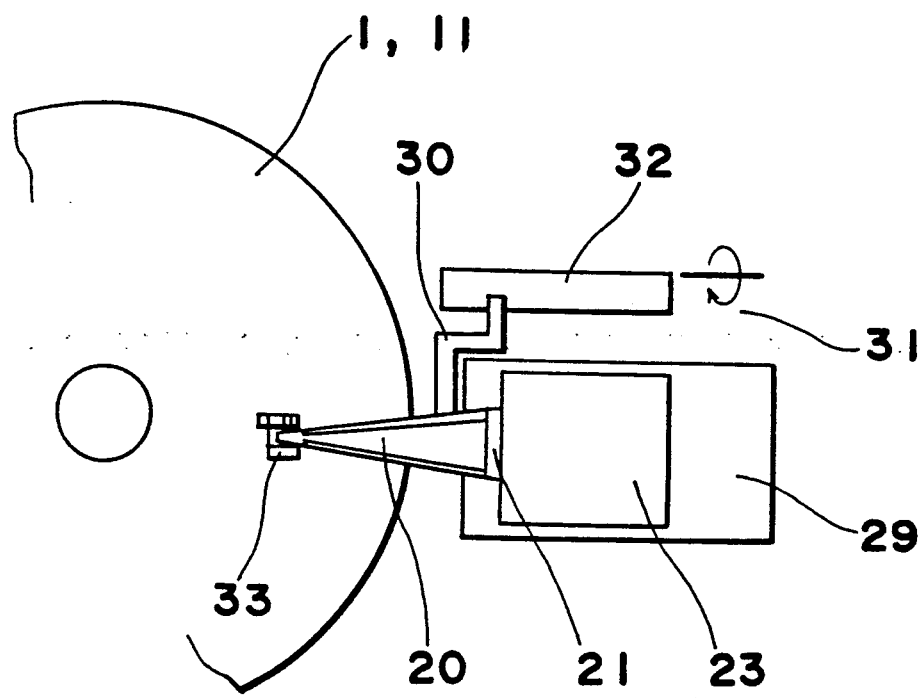
FIGS. 6 and 7 are a plan view and a side view, respectively, of the basic construction of a magneto-optical disk unit of a second embodiment according to the present invention.
Figure 7:
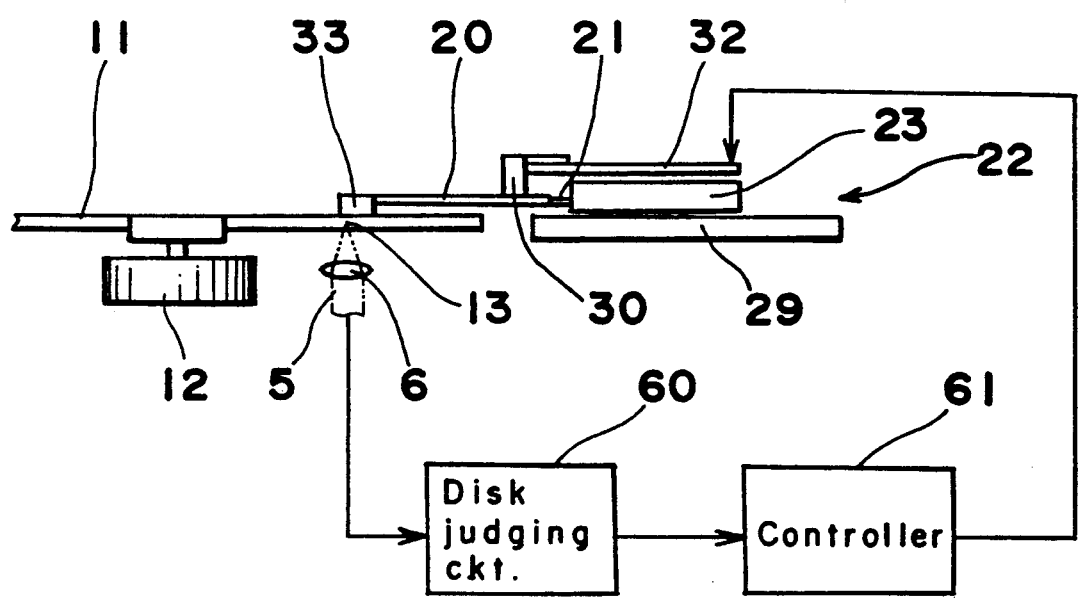

FIGS. 6 and 7 are a plan view and a side view, respectively, of the basic construction of a magneto-optical disk unit of a second embodiment according to the present invention. This magneto-optical disk unit of the present embodiment is different in the construction of a magnetic-field generator from the unit of Embodiment 1. In these figures, reference numeral 33 denotes a magnetic-field generator having both a first magnetic-field generating part that can generate a magnetic-field corresponding to a recording signal frequency band and a second magnetic-field generating part that can generate DC magnetic fields of both north and south poles. This magnetic-field generator 33 can float-travel above a magneto-optical disk by the aerodynamic effect.

Figure 8:
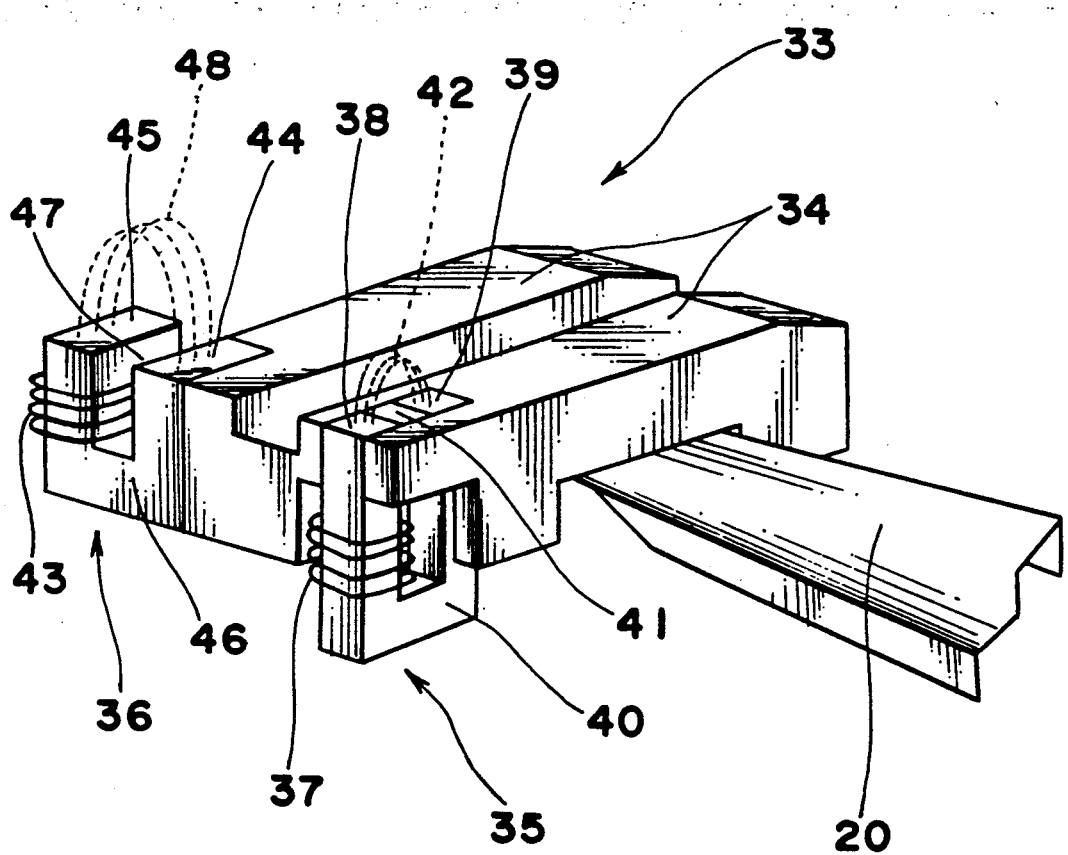
FIG. 8 is a perspective view of a magnetic-field generator used in the second embodiment.

FIG. 8 is an enlarged perspective view showing the detailed construction of the above magnetic-field generator 33. In the magnetic-field generator 33 of the present embodiment, a slider part 34 is of composite type which uses a non-magnetic material, and made up of a first magnetic-field generating part 35 for generating a magnetic field corresponding to a frequency in a recording signal frequency band and a second magnetic-field generating part 36 capable of generating DC magnetic fields of both north and south poles.

The first magnetic-field generating part 35 has a magnetic circuitry which can generate a magnetic field corresponding to a frequency in the recording signal frequency band, that is, the magnetic circuit is designed such that the inductance becomes a few $\mu H$ or less, as in Embodiment 1. This first magnetic-field generating part 35 is made up of a first coil 37, a first magnetic core 40 having a first magnetic pole 38 and a second magnetic pole 39, and a first magnetic gap 41, thus adapted to generate a magnetic field 42.

Similarly, the second magnetic-field generating part 36 is made up of a second coil 43, a second magnetic core 46 having a third magnetic pole 44 and a fourth magnetic pole 45, and a second magnetic gap 47, thus adapted to generate a magnetic field 48 of the same strength as that in the second magnetic-field generator 24 of Embodiment 1.

The load beam 20 of this embodiment supports the magnetic-field generator 33 at one end portion thereof and serves for bringing the magnetic-field generator 33 into contact with the surface of the magneto-optical disk 1. The load beam 20 is joined at the other end with the moving part 23 of the transfer driver 22 through the plate spring 21 such that an inclination angle of the load beam 20 can be changed with respect to the moving part 23. The moving part 23 can move in the same manner as in Embodiment 1 relative to the magneto-optical disk 1, 11. This magneto-optical disk unit of this embodiment also has a load beam support arm 30 joined with the load beam 20 and a rotary plate 32, as in Embodiment 1. Consequently, this embodiment 2 differs from the embodiment 1 in that means for generating a magnetic field of recording signal frequency band and means for generating a DC magnetic field are integrated together in embodiment 2.

The operation of the magneto-optical disk unit of embodiment 2 constructed as above is now described, where the same portions in respect to its function and operation are omitted in description.

First, at a time point or stage when a magneto-optical disk is loaded to the above magneto-optical disk unit, it is judged and decided by the disk judging circuit in the same way as in embodiment 1 whether the magneto-optical disk is of the magnetic-field modulation rewritable type 11 or of the erase-operation-required type 1.

When the loaded magneto-optical disk is judged to be of the erase-operation-required type 1, the rotary plate 32 is controlled by the controller 61 to hold the load-beam support arm 30 in a lifted state. As a result, the magnetic-field generator 33 does not come into contact with the magneto-optical disk 1. For this magneto-optical disk 1, the first magnetic-field generating part 35 is not used, but the second magnetic-field generating part 36 is used. If the magneto-optical disk 1 is free from surface fluctuation, the magnetic-field generator 33 is maintained a constant distance apart from the magneto-optical disk 1 at all times; actually, however, the load beam 20 is raised so as to provide a clearance of 1 mm or so in view of any possible surface fluctuation of the magneto-optical disk. Then a built-in controller within the magneto-optical disk unit, as described in embodiment 1, performs a sequence of initial operations.

Subsequently, a desired n-th track is accessed, where the access of the optical head (not shown) for recording and reproduction with the track is similar to that in embodiment 1. In the case of recording or erasing, synchronously with the access of the optical head, the third magnetic pole 44 of the magnetic-field generator 33 is moved by the transfer driver 22 to the vicinity of the n-th track. Current polarity of the second coil 43 is switched so that the third magnetic pole 44 will be an N magnetic pole for recording and an S magnetic pole for erasing, and then recording is accomplished by the laser beam 5 modulated by a recording signal under application of the magnetic field 48, otherwise erasing is accomplished by the continuous laser beam 5. This recording and erasing method uses the third magnetic pole 44 only, and the N and S magnetic poles are obtained by switching the current polarity of the second coil 43. Alternatively, a method is available that the third magnetic pole 44 is used for recording and the fourth magnetic pole 45 is for erasing without switching the current polarity of the second coil 43. In this case, the moving part 23 of the transfer driver 22 is moved back and forth for recording and erasing to thereby move the third magnetic pole 44 or the fourth magnetic pole 45 to the vicinity of the n-th track in accordance with the operation.

Furthermore in the above case, although an electromagnet is used in the second magnetic-field generating part 36, a permanent magnet having both N and S magnetic poles may be alternatively used as the second magnetic core 46. In this case, it is necessary to move the moving part 23 of the transfer driver 22 back and forth for recording and erasing, as in the case of embodiment 1.

Next, when the loaded magneto-optical disk is judged to be of the magnetic-field-modulation overwritable type 11, the controller 61 causes the rotary plate 32 to rotate, and thereby the magnetic-field generator 33 is brought into contact with the special overcoat layer 8 of the magneto-optical disk 11. For this magneto-optical disk 11, the second magnetic-field generating part 36 is not used but the first magnetic-field generating part 35 is used. When the magneto-optical disk 11 starts to rotate, a slider part 34 starts to travel in a sliding manner on the magneto-optical disk 11 and, when the magneto-optical disk 11 reaches a steady rotational state, the slider part 34 comes into a stable float-travel state. If overwriting is performed to the n-th track, the transfer driver 22 drives the magnetic-field generator 33 to move the first magnetic pole 38 of the magnetic-field generator 33 to the vicinity of the n-th track in order that a recording magnetic field modulated by a modulation signal is provided to the magneto-optical disk 11. A current of the modulation-signal is supplied to the first coil 37 to generate the magnetic field 42 corresponding to the modulation signal. Overwriting is accomplished in this way. The operation of the transfer driver 22 during reading and after overwriting can be determined depending on the design concept of the magneto-optical disk unit, as in embodiment 1.

As described above, the magneto-optical disk unit of the present embodiment has a magnetic-field generator, as means for providing the magneto-optical disk with a magnetic field, having a first magnetic-field generating part adapted to generate magnetic fields corresponding to frequencies in a recording signal frequency band, and a second magnetic-field generating part capable of generating DC magnetic fields of both north and south poles. The magnetic-field generator is so constructed that it can float-travel above the magneto-optical disk by an aerodynamic effect. The magnetic-field generator is mounted to drive means that can travel in a direction parallel to that of the magneto-optical disk and, moreover, is provided with an up-down drive means that brings the magnetic-field generator into contact with the surface of the magneto-optical disk. Accordingly, by selectively using the two magnetic-field generating parts depending on the type of a loaded magneto-optical disk, the magneto-optical disk unit of the present embodiment is compatible with not only magneto-optical disks of the magnetic-field-modulation overwritable type but also with magneto-optical disks of the erase-operation-required type.

Further, in this embodiment, since the first and second magnetic-field generating parts are integrated together, the entire magnetic-field generator can be reduced in size, when compared with embodiment 1, and, therefore, it is easy to put it in a window of a cartridge case. Also, due to integration of the first and second magnetic-field generating parts, a moving range of the transfer driver can be smaller than in embodiment 1.

Accordingly, it is possible to make the transfer driver smaller in size than that of embodiment 1.

Embodiment 3

Figure 9:
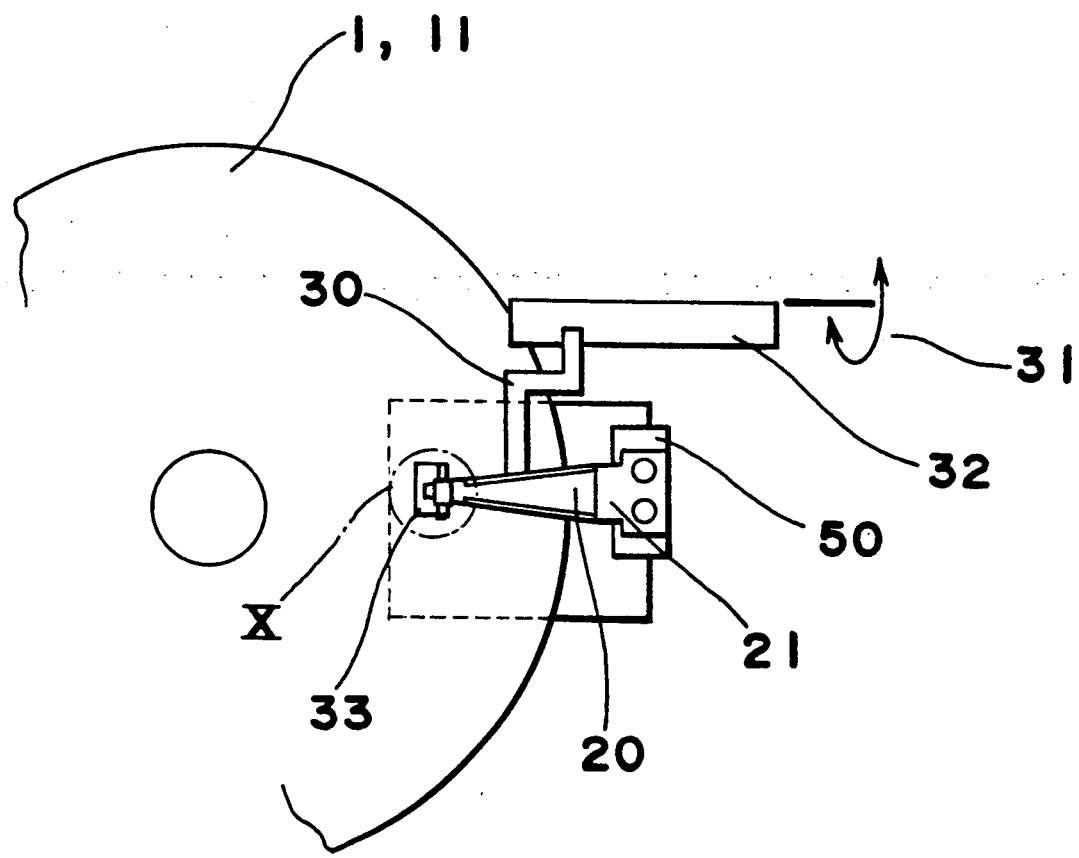
FIG. 9 is a plan view of a magneto-optical disk unit of a third embodiment of the present invention.
Figure 10:
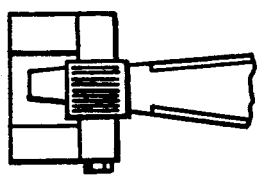
FIG. 10 is an enlarged view of an encircled portion X shown in FIG. 9.
Figure 11A:
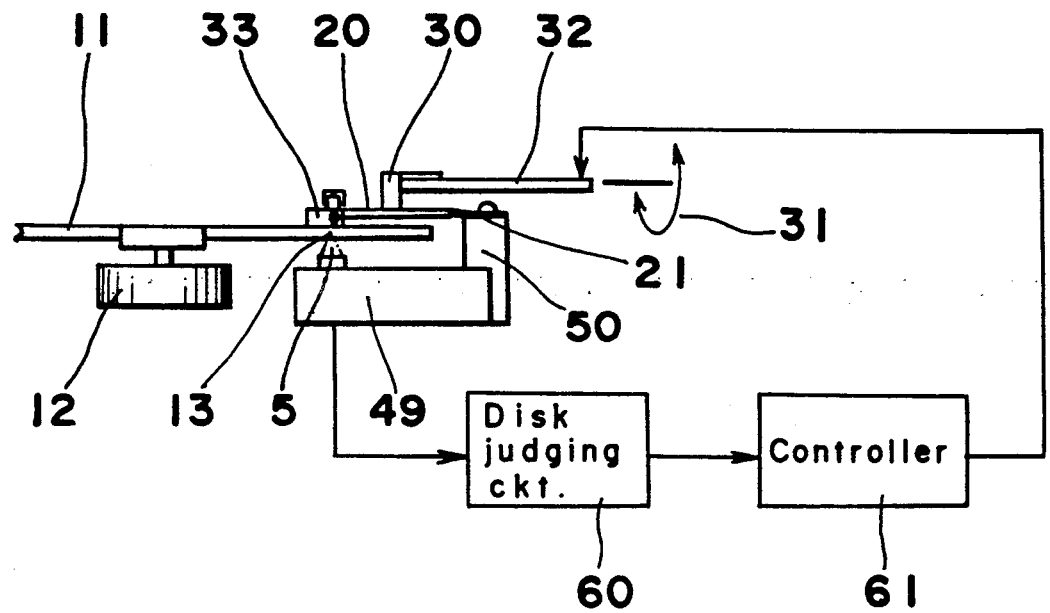
FIG. 11A and 11B are side views of the magneto-optical disk unit of FIG. 9 in different operation states.
Figure 11B:
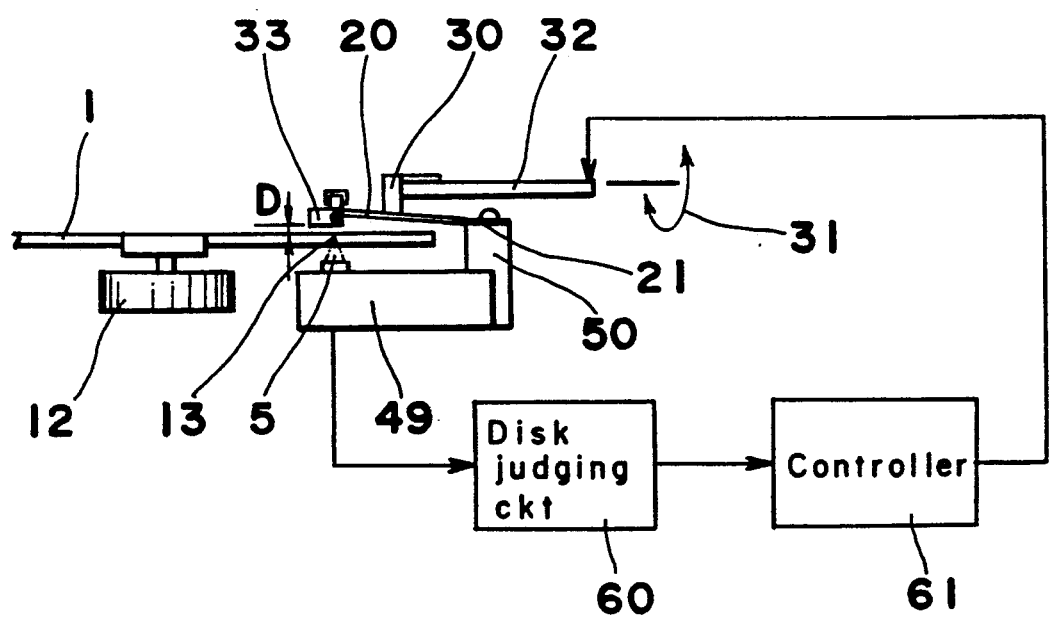
Figure 12:
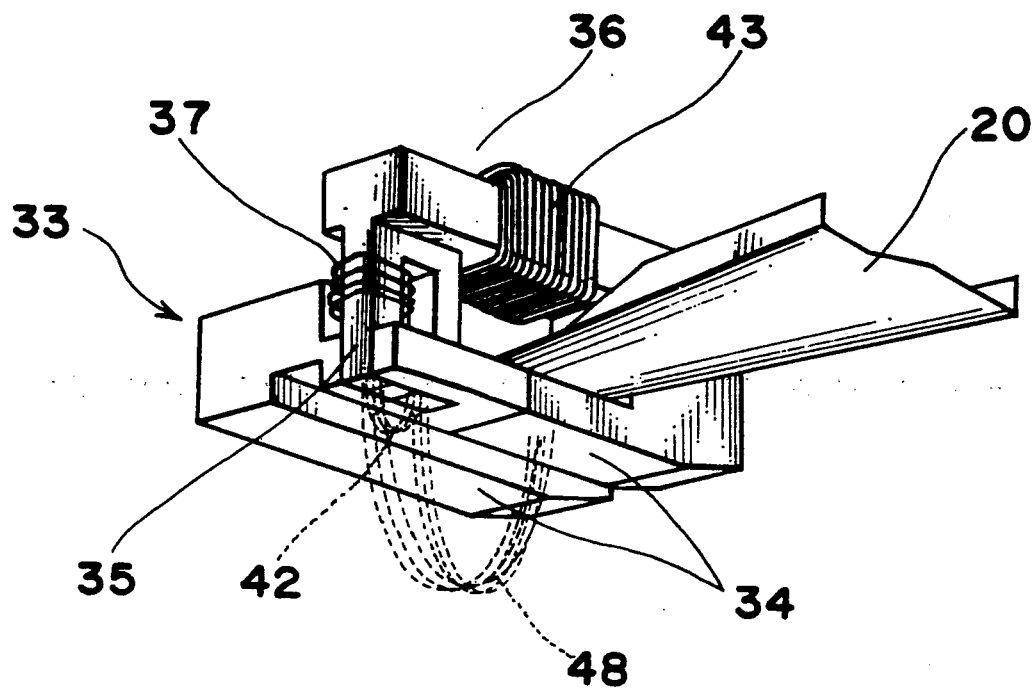
FIGS. 12 and 13 are perspective views of a magnetic-field generator used in a third embodiment.
Figure 13:
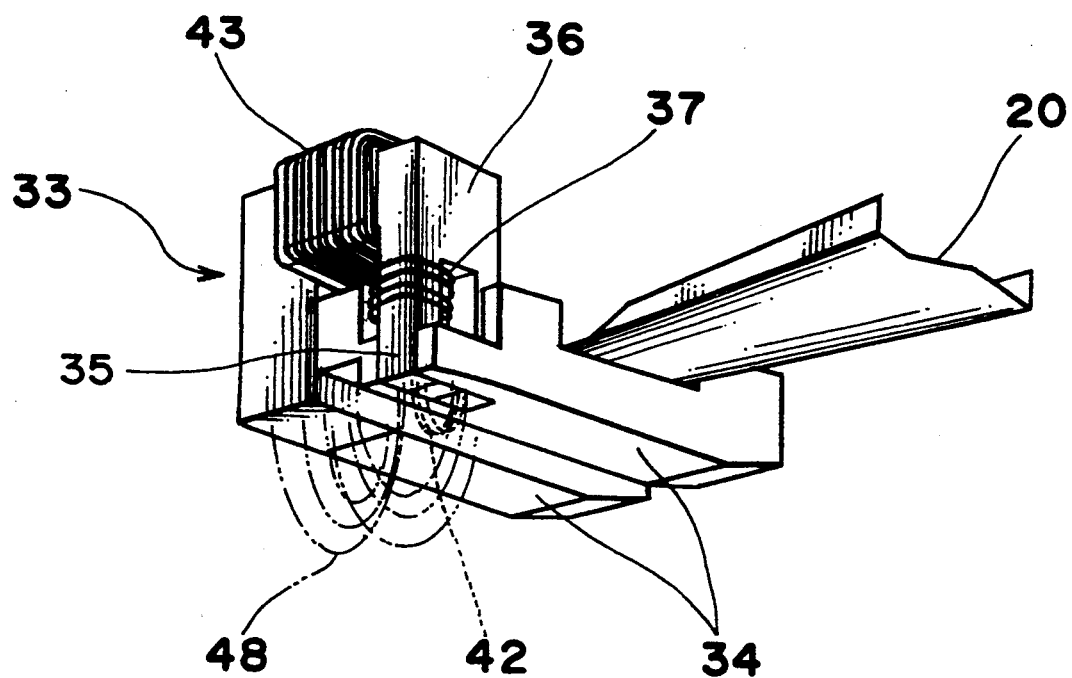

A third embodiment is shown in FIGS. 9 through FIGS. 13. FIG. 9 is a plan view of a magneto-optical disk unit of the third embodiment of the present invention, and FIG. 10 is an enlarged view of a portion indicated by "X" in FIG. 9. FIGS. 11A and 11B are respectively side views of the magneto-optical disk unit in different operational states. FIGS. 12 and 13 are different examples of a field-magnetic generator 33 of the magneto-optical disk unit.

It is to be noted here that the field-magnetic generators of FIGS. 12 and 13 basically has the same basic construction, except for the disposition of the magnetic circuitry. The side view of FIG. 11A illustrates an operation state for a magnetic-field-modulation rewritable magneto-optical disk 11 as shown in FIG. 3B, while the side view of FIG. 11B illustrates an operation state for an erase-operation-required type disk 1 as shown in FIG. 3A.

In FIGS. 11A and 11B, reference numeral 49 denotes an optical head. The optical head 49 is connected with the load beam 20 of the magnetic-field generator 33 by a connecting member 50. Accordingly, as the optical head 49 moves in a radial direction of a magneto-optical disk 1 or 11 to access the disk 1 or 11, the magnetic-field generator 33 also moves along therewith. For this reason, in the present embodiment, a transfer means for the optical head serves also as a transfer means for the magnetic-field generator 33.

As apparent from FIGS. 12 and 13, the present embodiment differs from embodiment 2 in that the first and second magnetic-field generating parts 35 and 36 of the magnetic-field generator 33 of this embodiment are formed of a single magnetic circuit. More specifically, a single magnetic circuit allows formation of the first magnetic-field generating part 35, on which the first coil 37 is wound for generating a magnetic field of recording signal frequency band, and the second magnetic-field generating part 36, on which the second coil 43 is wound for generating a DC magnetic field. Further, the magnetic-field generator 33 is provided with the slider part 34 so as to float-travel above the magneto-optical disk. When a current is applied to the first coil 37, the magnetic field 42 develops; when a current is applied to the second coil 43, the magnetic field 48 develops. The first coil 37 has about 10 turns, as in the first magnetic-field generator 14 of embodiment 1. On the other hand, the second magnetic-field generating part 36 also has the same capability of generating a magnetic field as the second magnetic-field generator 24 of embodiment 1. The magnetic-field generator 33 is adjusted in its position by the connecting member 50 such that vertical components of the magnetic field 42 with respect to the disk 1 or 11 will be the maximum at a convergence spot of the laser beam 5 from the optical head 49.

The operation of the magnetic-field generator and the magneto-optical disk unit constructed as above are described below. First, in a similar way to that of the previous embodiments, it is judged by the disk judging circuit 60 whether a loaded magneto-optical disk is a conventional erase-operation-required type disk 1 or a magnetic-field-modulation overwritable disk 11, in the same manner as in embodiment 1.

When it is the magnetic-field-modulation overwritable magneto-optical disk 11, the rotary plate 32 rotates, so that the magnetic-field generator 33 lowers onto the magneto-optical disk 11 as shown in FIG. 11A. Then the magneto-optical disk 11 starts to rotate. When the magneto-optical disk 11 comes into its steady rotational state, the magnetic-field generator 33 float-travels over the magneto-optical disk 11. As a method of making the magnetic-field generator 33 float-travel, there is an alternative in which the magnetic-field generator 33 is made to approach to the magneto-optical disk 11 after the disk 11 comes to rotate steadily. Thereafter, overwriting to or reading from the disk is effected.

For reading or reproduction, there is no need of to generate a magnetic field. Therefore, no current is applied to the two coils of the magnetic-field generator 33. For overwriting, a signal having a signal frequency of, for example, a few MHz is applied to the first coil 37 to generate the magnetic field 42, while the magneto-optical recording layer 3 (see FIGS. 3A and 3B) is simultaneously heated by the laser beam 5. In this way, the magneto-optical disk 11 is overwritten.

When the loaded disk is of the erase-operation-required type 1, the controller 61 controls the rotary plate 32 not to rotate. As a result, the magnetic-field generator 33 is maintained approximately 1 mm apart from the magneto-optical disk 1, as shown in FIG. 11B, during write, read and erase operations. For the read operation, there is no need of generating a magnetic field and therefore no current flows through the two coils of the magnetic-field generator 33.

To carry out the erase operation, a DC current is applied to the second coil 43 so as to generate a magnetic field in a direction in which data is erased. Simultaneously with application of a DC current to the second coil 43, the laser beam 5 is continuously fired to the magneto-optical recording layer 3.

During the write process, a DC current is applied to the second coil 43 in a direction reverse to that for erasing, while the magneto-optical recording layer 3 is heated by the laser beam 5 modulated by a recording signal. Data is written to the disk in this way.

The magneto-optical disk unit of the present embodiment has the following advantage in addition to the advantages of the previous embodiments. That is, since the optical head 49 and the magnetic-field generator 33 are connected with each other by the connecting member 50, the magnetic-field generator 33 is also moved by the transfer mechanism of the optical head 49. As a result, the transfer driver 22 for exclusive use with the magnetic-field generator, as disclosed in embodiments 1 and 2, is no longer necessitated.

Embodiment 4

Figure 14:
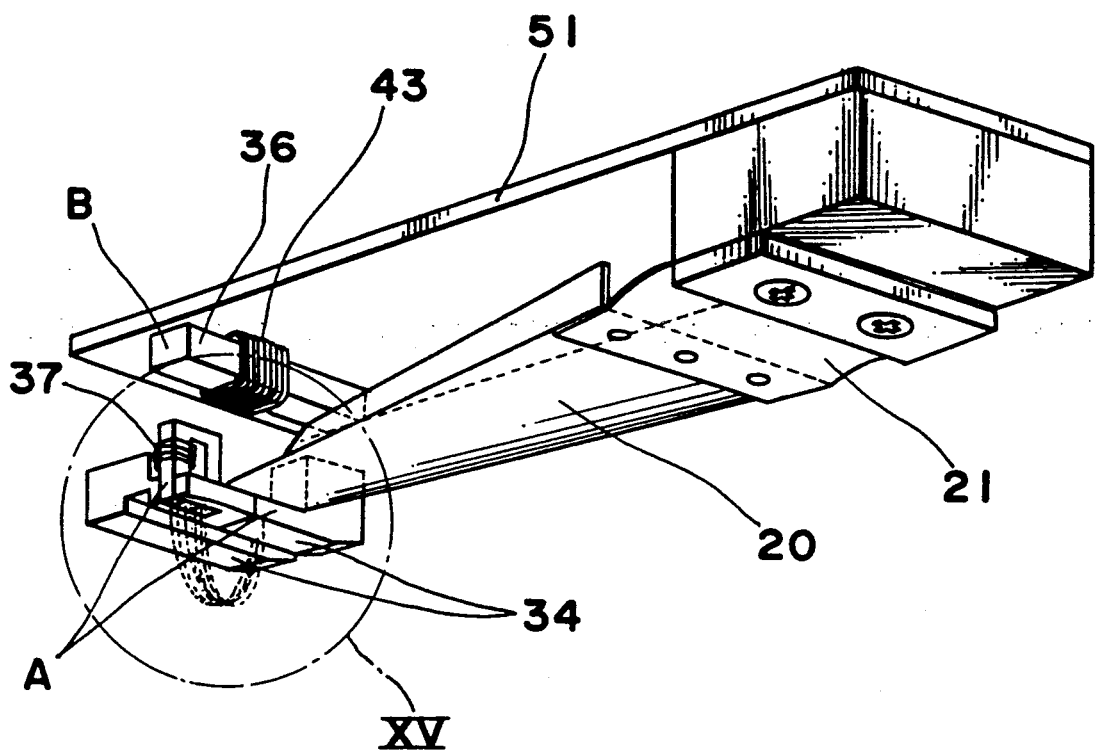
FIG. 14 is a perspective view of a magnetic-field generator used in a fourth embodiment according to the present invention.
Figure 15:
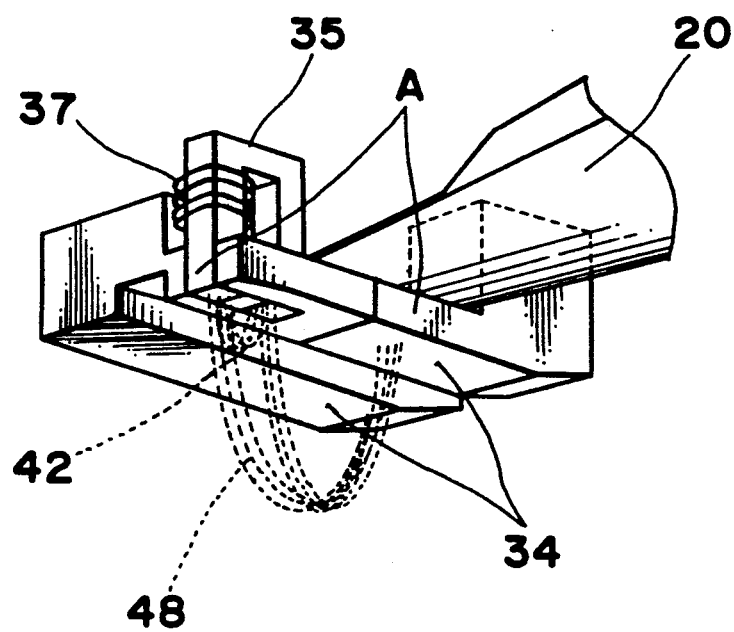
FIG. 15 is an enlarged view of an encircled portion indicated by XV shown in FIG. 14.

A fourth embodiment of the present invention is now described with reference to FIG. 14, 15 and 16A-16C. FIG. 14 is a perspective view of a magnetic-field generator of a fourth embodiment according to the present invention and FIG. 15 is an enlarged view of a portion indicated by "XV" in FIG. 14. The fourth embodiment differs from the third embodiment primarily in that the first and second magnetic-field generating parts are arranged so as to be separable from each other. This means that its magnetic circuit can be separated.

In FIGS. 14 and 15, reference character A designates one magnetic circuit forming a first magnetic-field generating part, wherein the first coil 37 is provided for generating a magnetic field of recording signal frequency band. On the other hand, character B designates the other magnetic circuit forming a second magnetic-field generating part, wherein the second coil 43 is provided for generating a DC magnetic field. The magnetic circuit A has the slider part 34 for float-travel (hereinafter, the magnetic circuit A side having the slider part 34 is referred to as a moving part A of the magnetic-field generator). The magnetic circuit B is fixed to an arm 51 having rigidity, and connected with the optical head 49 through the connecting member 50 (hereinafter, the magnetic circuit B side is referred to as a fixed part B of the magnetic-field generator). In other words, the moving part A is the first magnetic-field generating part, while the fixed part B is the second magnetic-field generating part.

The moving part A is connected to the arm 51 through the load beam 20 and the plate spring 21.

When a current is applied to the first coil 37, the magnetic field 42 develops. This magnetic field 42 is used when a magneto-optical disk of the magnetic-field-modulation overwritable type 11 (see FIG. 3B) is overwritten. On the other hand, when a current is applied to the second coil 43 with the magnetic circuit A and the magnetic circuit B integrated together by various methods as described below, the magnetic field 48 develops. This magnetic field 48 is used when a magneto-optical disk of the erase-operation-required type 1 (see FIG. 3A) is erased and written to.

Figure 16A:
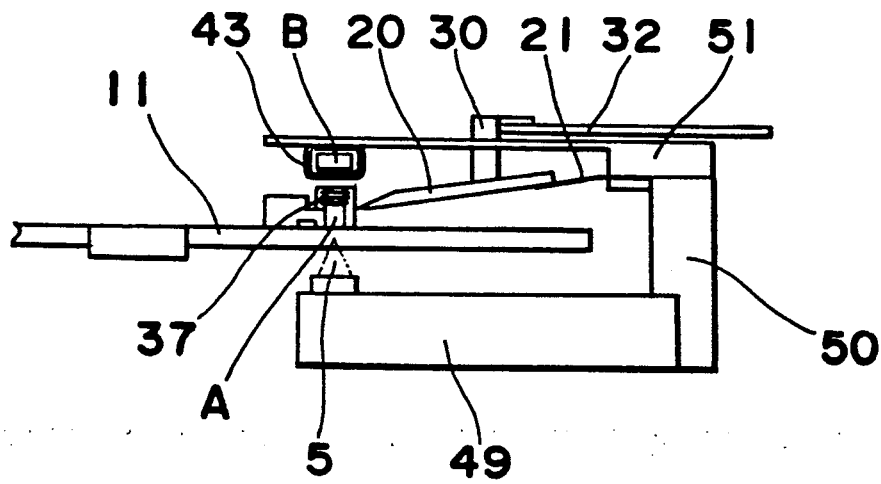
FIGS. 16A, 16B and 16C are schematic illustrations of side views of a magneto-optical disk unit and its variants of the fourth embodiment according to the present invention.
Figure 16B:
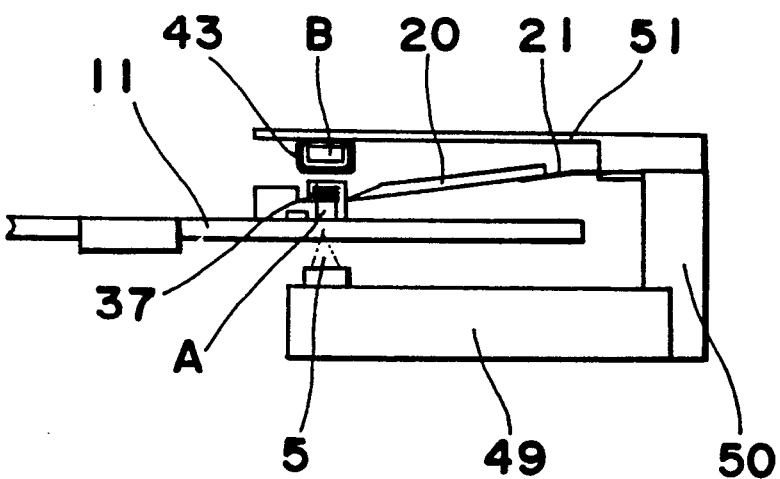
Figure 16C:
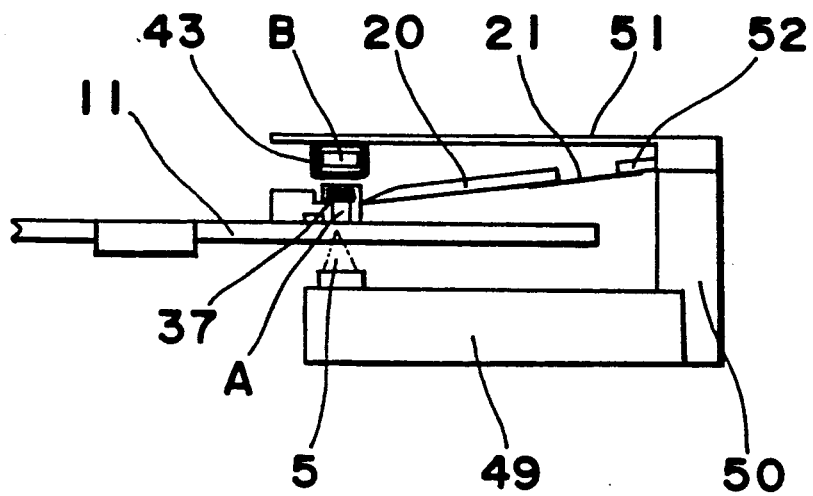

There are different methods of moving the moving part of the magnetic-field generator up and down as shown in FIGS. 16A–16C. When the moving part is lifted to come into contact with the fixed part, the magnet circuits A and B are integrated.

In the case of FIG. 16A, the rotary plate 32 is used as means for moving the magnetic-field generator up and down as in the foregoing embodiments 1-3. When a loaded magneto-optical disk is judged to be of the magnetic-field-modulation overwritable type 11 by the disk judging circuit 60 (this circuit 60 and the controller 61 are omitted from FIGS. 16A–16C), the rotary plate is rotated and lowers the moving part of the magnetic-field generator onto the disk 11, as shown in FIG. 16A. From this condition, the moving part enters the float-travel state. By applying a modulation signal current to the first coil 37, the magnetic-field-modulation overwriting can be carried out.

If a loaded magneto-optical disk is of the erase-operation-required type 1, the rotary plate 32 is not rotated. As a result, in each state of recording, reading, and erasing, the moving part of the magnetic-field generator are in contact with the fixed part. In this state, the moving part of the magnetic-field generator holds approximately 1 mm apart from the magneto-optical disk 1. To effect recording and erasing, a DC current is applied to the second coil 43.

In the case of FIG. 16B, the magnetic circuit B is utilized to move the moving part of the magnetic-field generator up and down. More specifically, the moving part is lifted by a suction force that arises when a current is applied to the coil 43. For the magnetic-field-modulation overwritable magneto-optical disk 11, no current is applied to the coil 43 such that no suction force is generated. Therefore, the moving part lowers onto the disk 11.

For the erase-operation-required magneto-optical disk 1, on the other hand, a current is applied to the coil 43 to raise the moving part, thereby making the magnetic circuit A and the magnetic circuit B connected with each other. The current applied to the coil 43 not only allows the magnetic circuit A and the magnetic circuit B to be connected, but also provides the magnetic field 48 necessary for recording and erasing. It is of course necessary to switch current polarity between recording and erasing. This switching can be done with the magnetic circuit A and the magnetic circuit B kept as it is connected, by doing an instantaneous switching. That is, there is no possibility that the moving part be brought into contact with the erase-operation-required disk 1. It is also necessary to apply a current to the coil 43 even during the read operation in order to keep the connection between the magnetic circuits A and B. However, the magneto-optical disk will not be impaired by virtue of its sufficiently great coercive force.

In the case of FIG. 16C, an element 52 which transforms with an electrical signal is utilized to move the moving part of the magnetic-field generator. In this case, The moving part of the magnetic-field generator is mounted to the foregoing arm 51 by means of the load beam 20, the spring 21, and the element 52.

The element 52 is formed of a shape memory alloy and a heating element or is a piezoelectric element such as a bimorph. When the element 52 is formed of a shape memory alloy and a heating element, the element 52 operates as follows. When the heating element is not energized, that is, under a room temperature, the shape memory alloy will not transform. The result of this is that the moving part of the magnetic-field generator comes into the raised state, or the state in which the magnetic circuits A and B are connected together. When the heating element is energized, the shape memory alloy is heated and thereby transformed. As a result, the moving part lowers onto the magneto-optical disk 11, thus realizing the float-travel state. Also when a piezoelectric element is used, the vertical movement of the moving part is controlled depending on whether or not a voltage is applied to the piezoelectric element.

As described above, the present embodiment of the invention enables overwriting of both the magnetic-field-modulation overwritable magneto-optical disks and the recording, reading, and erasing of the magneto-optical disks that require the erasing process, as in embodiments 1, 2, and 3. The present embodiment differs from embodiment 3 in that the magnetic circuit is made separable into the fixed part and the moving part. Such an arrangement allows the moving part to be reduced in weight and moreover enables a stable float-travel state for magnetic-field-modulation overwriting.

Embodiment 5

Figure 17:
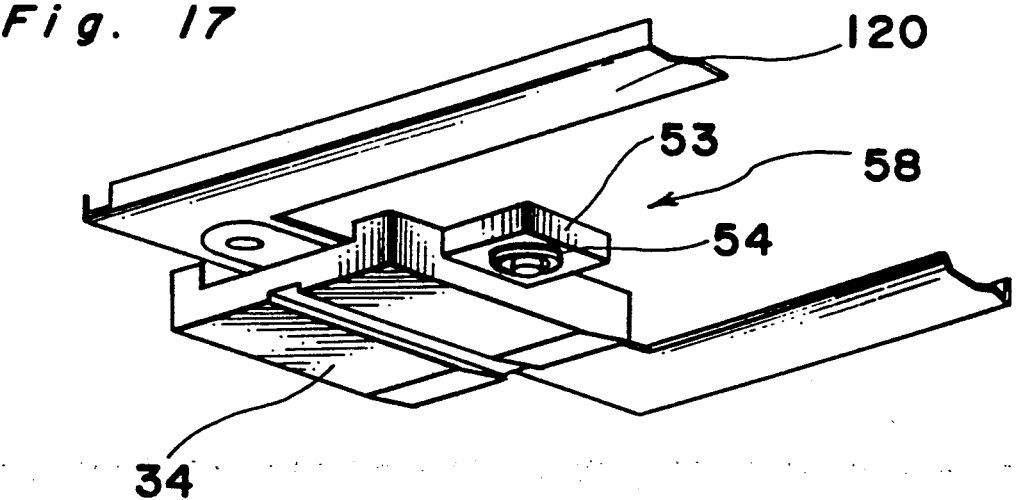
FIGS. 17 and 18 are a perspective view and a side view, respectively, of a magnetic-field generator of a fifth embodiment of the present invention.
Figure 18:
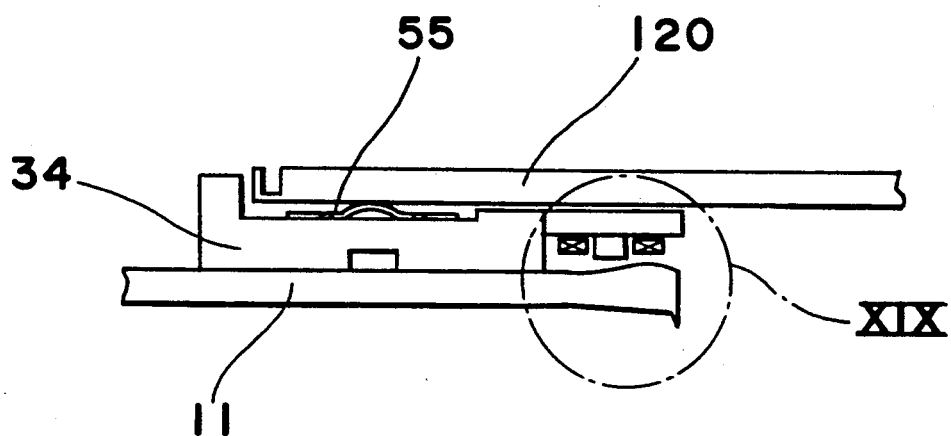
Figure 19:
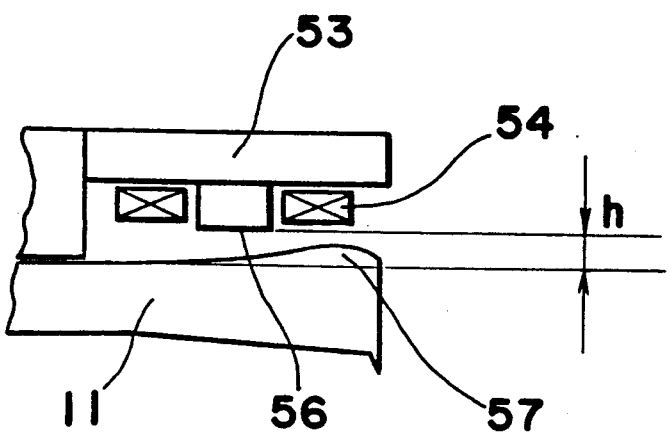
FIG. 19 is an enlarged view of an encircled portion XIX shown in FIG. 18.
Figure 24:
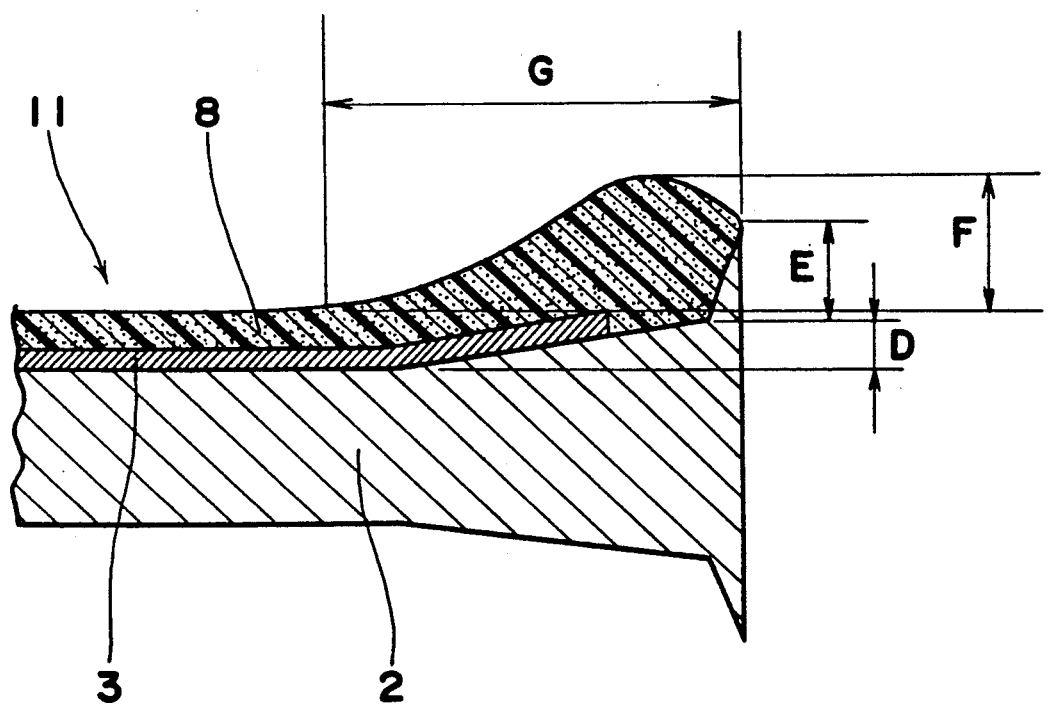
FIG. 24 is a sectional view showing a rim portion of a magneto-optical disk.

A fifth embodiment of the present invention is now described with reference to FIGS. 17–19. FIG. 17 is a perspective view of a magnetic-field generator 58 of this embodiment, FIG. 18 is a side view of the magnetic-field generator and FIG. 19 is an enlarged view of a portion indicated by XIX in FIG. 18. In FIGS. 17–19, reference numeral 120 denotes a suspension for the magnetic-field generator 58. The magnetic-field generator comprises a magnetic-field generating part 53 capable of generating a magnetic field of recording signal frequency band, a coil 54 and a slider part 34. The suspension 120 and the slider part 34 are connected to each other by a gimbal 55. The magnetic-field generator 58 of the present embodiment recedes from the slide surface of the slider 34 so that an end face of a magnetic pole 56 of the magnetic-field generating part 53 does not contact with a magneto-optical disk, and moreover the above magnetic pole 56 is disposed on a side of the slider part 34 such that the magnetic pole 56 is positioned outwardly of the slider part 34 relative to a radial direction of the magneto-optical disk. An outer rim portion 57 of the magneto-optical disk forms a protuberance (see FIG. 24). Due to this, with the slider surface and the magnetic-pole end surface flush with each other, when the magnetic-field generator 58 moves to the vicinity of the periphery of the magneto-optical disk, the float-travel state would become unstable. However, in the present embodiment, since the magnetic-pole end surface is retreated from the slider surface by a distance "h", such an unstable travel will not result. This is because, even when the magnetic-field generator 58 accesses the outermost periphery of the disk, the slider part 34 travels over the portions without the protuberance. The above-mentioned distance h is determined in view of the amount of the protuberance of magneto-optical disk. Generally it is preferable to set the distance "h" in the range of 50 to 100 μm or so. If the distance "h" is too large, the magnetomotive force of the magnetic-field generating part 53 needs to be accordingly large.

Figure 20:
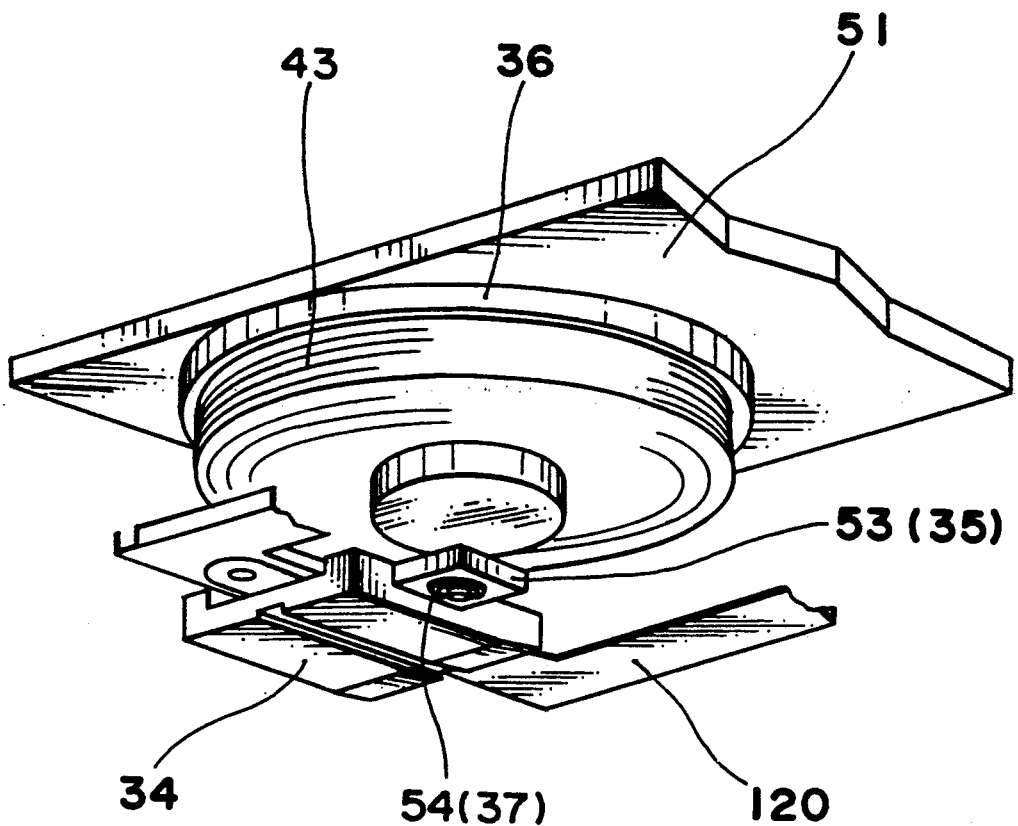
FIGS. 20 and 21 are a perspective view and a side view, respectively, of a separable magnetic-field generator incorporating the magnetic-field generator of the fifth embodiment as a first magnetic-filled generating part.
Figure 21:
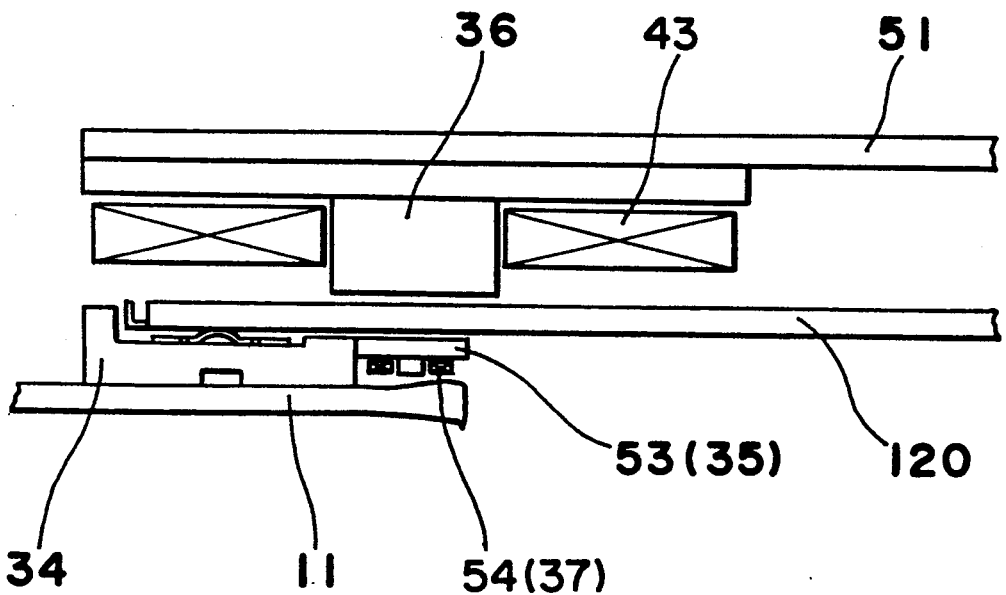

The magnetic-field generating part 53 is used as the first magnetic-field generating part 35 and also the coil 54 is used as the first coil 37 when the magnetic-field generator 58 is associated with the separate second magnetic-field generating part 36 supported by the arm 51 as shown in FIGS. 20 and 21, as in embodiment 4. The slider part 34 is, in this case, composed of non-magnetic material. This is because when the second magnetic-field generator 36 is used for a magneto-optical disk of the type that requires the erasing process, a slider composed of any magnetic material would let a magnetic field pass through the slider and therefore would impair the strength of the magnetic field applied to the magneto-optical disk. FIGS. 20 and 21 illustrate the state that the first magnetic-field generating part 53 (35) and the second magnetic-field generating part 36 are separated from each other, or the state that the magnetic-field generator is float-traveling above a magnetic-field-modulation overwritable magneto-optical disk 11.

As described above, the present embodiment of the invention has a feature that a stable float-travel can be obtained even when the magnetic-field generator 58 moves to the vicinity of the periphery.

Although, in the above embodiments 3 and 4, the magnetic circuit of the first magnetic-field generating part 35 in which the first coil 37 is wound to generate the magnetic field 42 is ring-shaped or U-shaped, and the magnetic circuit of the second magnetic-field generating part 36 in which the second coil 43 is wound to generate the magnetic field 48 is also ring-shaped or U-shaped, yet these may be replaced with convexly shaped magnetic circuits. In addition, in embodiment 5, although the magnetic-field generating parts 35 and 36 are both convexly shaped, one of them may be ring-shaped.

Figure 22:
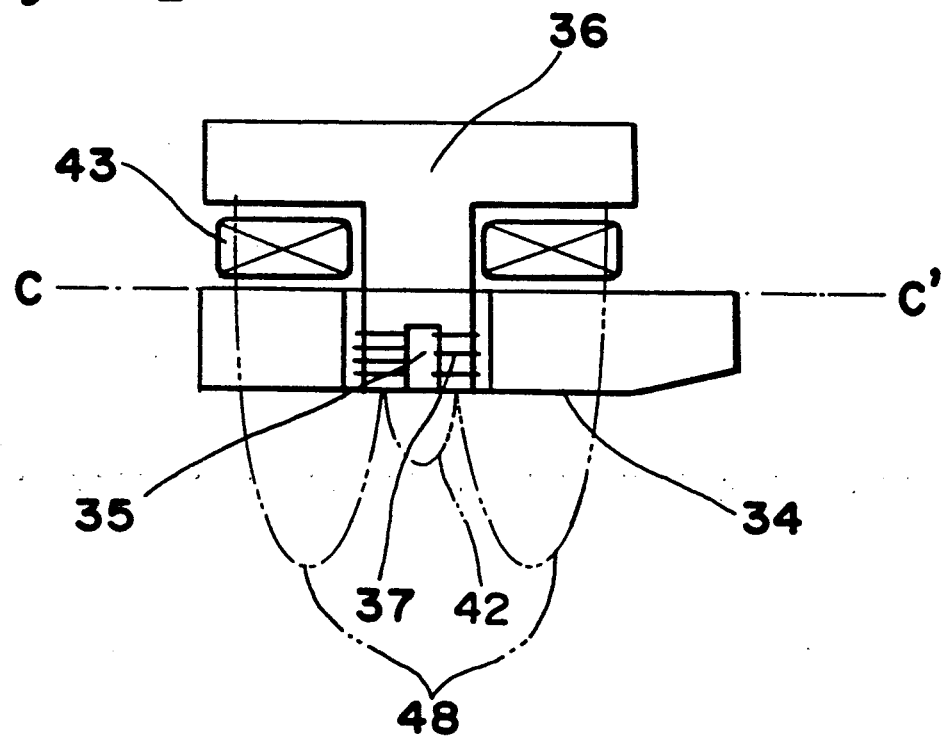
FIGS. 22 and 23 are schematic illustrations showing side views of examples of magnetic-field generating parts shaped differently from those of the above embodiments.
Figure 23:
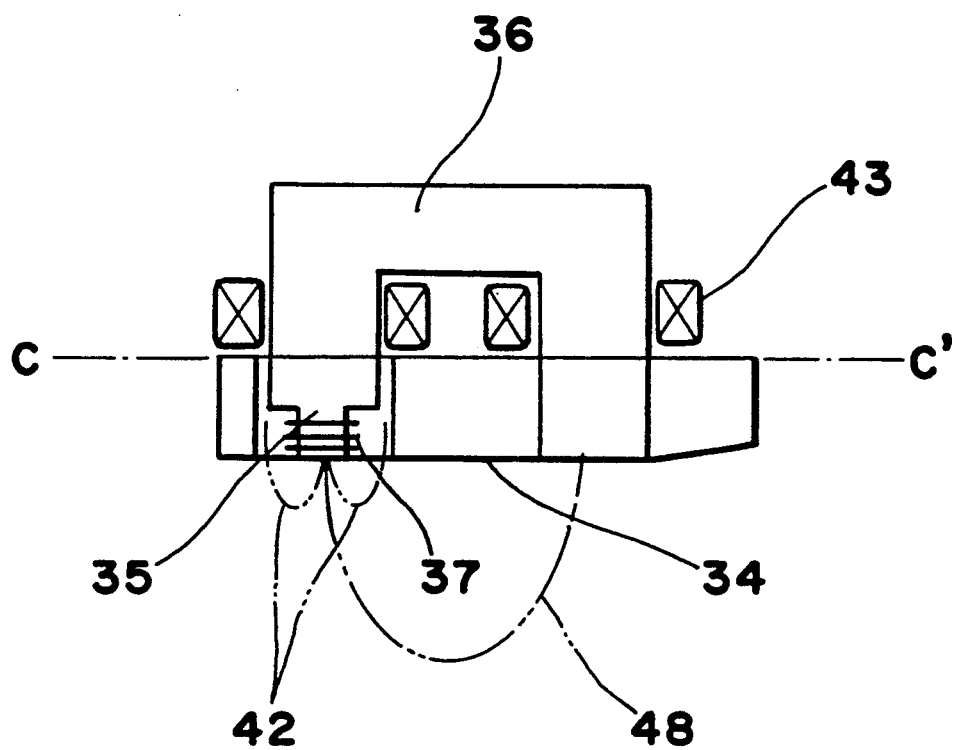

FIGS. 22 and 23 show other examples of the configuration of the first and second magnetic-field generating parts 35 and 36. In FIG. 22, the first magnetic-field generating part 35 is ring-shaped or U-shaped, and the second 36 is convexly shaped. In FIG. 23, the first magnetic-field generating part 35 is convexly shaped and the second 36 is ring-shaped or U-shaped. In these figures, the magnetic circuits are integrated into one piece. However, the magnetic circuits of the first and second magnetic-field generating parts 35 and 36 may be separable from each other along the line C—C'. Furthermore, although in FIGS. 22 and 23 the magnetic-pole end portion of the first magnetic-field generating part 35 is flush with the slider 34 surface, the magnetic-pole end portion of the first magnetic-field generating part 35 may be retreated from the slider 34 surface, as shown in embodiment 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical disk unit for recording on a magneto-optical disk loaded therein, the magneto-optical disk being either one of a first type of magneto-optical disk that can be overwritten through modulation of a magnetic field and a second type of magneto-optical disk that requires an erase operation prior to undergoing a write operation, said magneto-optical disk unit comprising:

a first magneto-field generator for generating a first magnetic field corresponding to a frequency in a recording signal frequency band when a loaded magneto-optical disk is the first type of magneto-optical disc, said first magnetic-field generator having a slider part for sliding over a surface of the loaded magneto-optical disk in a floating manner using an aerodynamic effect;

a second magnetic-field generator for generating a second magnetic field having DC magnetic fields of both north-seeking and south-seeking poles when the loaded magneto-optical disk is the second type of magneto-optical disk, the second magnetic-field generator being spaced from the surface of the loaded second type of magneto-optical disk;

drive means for moving said first and second magnetic-field generators in a direction parallel to the surface of the loaded magneto-optical disk; and up-down drive means for vertically moving said first magnetic-field generator to bring it into contact with the surface of the loaded magneto-optical disk when the loaded magneto-optical disc is the first type of magneto-optical disc.

2. The magneto-optical disk unit as claimed in claim 1, further comprising:

judging means for judging whether the loaded magneto-optical disk is the first type or the second type of magneto-optical disk; and controlling means for, based on a judging result of said judging means, controlling said up-down drive means such that:

a) when the loaded magneto-optical disk is judged by said judging means to be the first type of magneto-optical disk, said first magnetic-field generator comes into contact with the loaded magneto-optical disk and thereafter applies said first magnetic field onto the loaded magneto-optical disk, and b) when the loaded magneto-optical disk is judged to be the second type of magneto-optical disk, said first magnetic-field generator is maintained a predetermined distance apart from the surface of the loaded magneto-optical disk and said second magnetic field generator applies said second magnetic field onto the loaded magneto-optical disk while spaced from the surface of the loaded magneto-optical disk.

3. A magneto-optical disk unit for recording on a magneto-optical disk loaded therein, the magneto-optical disk being either one of a first type of magneto-optical disk that can be overwritten through modulation of a magnetic field and a second type of magneto-optical disk that requires an erase operation prior to undergoing a write operation, said magneto-optical disk unit comprising:
- a magnetic-field generator having a first magnetic-field generating part for generating a first magnetic field corresponding to a frequency in a recording signal frequency band when a loaded magneto-optical disk is the first type of magneto-optical disk and a second magnetic-field generating part for generating a second magnetic field having DC magnetic fields of both north-seeking and south-seeking poles, said second magnetic field generating part spaced from a surface of the loaded magneto-optical disk when the loaded magneto-optical disk is the second type of magneto-optical disk, said magnetic-field generator having a slider part for sliding over the surface of the loaded magneto-optical disk in a floating manner using an aerodynamic effect;
- drive means for horizontally moving said magnetic-field generator in a direction parallel to the surface of the loaded magneto-optical disk; and
- up-down drive means for vertically moving said magnetic-field generator to bring it into contact with the surface of the loaded magneto-optical disk.

4. The magneto-optical disk unit as claimed in claim 3, further comprising:
- judging means for judging whether the loaded magneto-optical disk is the first type or the second type of magneto-optical disk; and
- controlling means for, based on a judging result of said judging means, controlling said up-down drive means such that:
  a) when the loaded magneto-optical disk is judged by said judging means to be the first type of magneto-optical disk, said magnetic-field generator comes into contact with the loaded magneto-optical disk and thereafter applies said first magnetic field onto the loaded magneto-optical disk by means of said first magnetic-field generating part, and
  b) when the loaded magneto-optical disk is judged to be the second type of magneto-optical disk, said magnetic-field generator is maintained a predetermined distance apart from the surface of the loaded magneto-optical disk and applies said second magnetic field onto the loaded magneto-optical disk by means of said second magnetic-field generating part.

5. The magneto-optical disk unit as claimed in claim 3, wherein a magnetic pole of said first magnetic-field generating part is disposed on a side of said slider part such that said magnetic pole and said slider part are positioned adjacent each other in a radial direction of the surface of the loaded magneto-optical disk and said magnetic pole is located closer to a periphery of the loaded magneto-optical disk than said slider part, wherein an end surface of said magnetic pole confronting the surface of the loaded magneto-optical disk recedes from a slide surface of said slider part confronting the surface of the loaded magneto-optical disk such that said end surface is spaced further from the surface of the loaded magneto-optical disk than said slide surface.

6. The magneto-optical disk unit as claimed in claim 3, wherein said magnetic-field generator is physically separable into said first magnetic-field generating part and second magnetic-field generating part, said first magnetic-field generating part is provided with said slider part, and said up-down drive means brings only said first magnetic-field generating part into contact with a surface of the loaded magneto-optical disk when said first magnetic-field generating part is separated from said second magnetic-field generating part.

7. The magneto-optical disk unit as claimed in claim 6, further comprising:
- judging means for judging whether the loaded magneto-optical disk is the first type or the said second type of magneto-optical disk; and
- controlling means for, based on a judging result of said judging means, controlling said up-down drive means such that:
  a) when the loaded magneto-optical disk is judged by said judging means to be the first type of magneto-optical disk, said first magnetic-field generating part comes into contact with the loaded magneto-optical disk and thereafter applies said first magnetic field onto the loaded magneto-optical disk, and
  b) when the loaded magneto-optical disk is judged to be the second type of magneto-optical disk, said first magnetic-field generating part is maintained a predetermined distance apart from the loaded magneto-optical disk and said second magnetic-field generating part applies said second magnetic field onto the loaded magneto-optical disk.

8. The magneto-optical disk unit as claimed in claim 6, wherein said second magnetic-field generating part is fixed to an arm having a rigidity, and said first magnetic-field generating part is mounted to said arm through an elastic member such that said first magnetic-field generating part is variable in distance from said second magnetic-field generating part, said first magnetic-field generating part thereby being connected with and separated from said second magnetic-field generating part.

9. The magneto-optical disk unit as claimed in claim 6, wherein said second magnetic-field generating part is fixed to an arm having a rigidity, and first magnetic-field generating part is mounted to said arm through an elastic member and an element transformable with an electrical signal such that said first magnetic-field generating part is variable in distance from said second magnetic-field generating part, said first magnetic-field generating part thereby being connected with and separated from said second magnetic-field generating part.

10. The magneto-optical disk unit as claimed in claim 9, wherein said element transformable with an electrical signal is formed of a shape memory alloy and a heating element.

11. The magneto-optical disk unit as claimed in claim 9, wherein said element transformable with an electrical signal is a piezoelectric element.

12. The magneto-optical disk unit as claimed in claim 6, wherein a magnetic field generated from said second magnetic-field generating part is controlled such that said first magnetic-field generating part is movable toward said second magnetic-field generating part by a suction force of the magnetic field, said first magnetic-field generating part thereby being connected with and separated from said second magnetic-field generating part.

13. The magneto-optical disk unit as claimed in claim 6, wherein a magnetic pole of said first magnetic-field generating part is disposed on a side of said slider part such that said magnetic pole and said slider part are positioned adjacent each other in a radial direction of the surface of the loaded magneto-optical disk and said magnetic pole is located closer to a periphery of the load magneto-optical disk than said slider part, wherein an end surface of said magnetic pole confronting the surface of the loaded magneto-optical disk recedes from a slide surface of said slider part confronting the surface of the loaded magneto-optical disk such that said end surface is spaced further from the surface of the loaded magneto-optical disk than said slide surface.

* * * * *